(12) United States Patent
Hoshi et al.

(10) Patent No.: US 7,184,642 B2
(45) Date of Patent: Feb. 27, 2007

(54) THREE-DIMENSIONAL PHOTONIC CRYSTAL AND OPTICAL ELEMENT

(75) Inventors: Hikaru Hoshi, Utsunomiya (JP);
Akinari Takagi, Utsunomiya (JP);
Kiyokatsu Ikemoto, Utsunomiya (JP);
Kazuya Nobayashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/189,620

(22) Filed: Jul. 25, 2005

(65) Prior Publication Data

US 2006/0029349 A1 Feb. 9, 2006

(30) Foreign Application Priority Data

Aug. 4, 2004 (JP) ............... 2004-228234

(51) Int. Cl.
*G02B 6/10* (2006.01)
(52) U.S. Cl. ...................... 385/129; 385/146
(58) Field of Classification Search .................. None
See application file for complete search history.

(56) References Cited

U.S. PATENT DOCUMENTS

| | | | |
|---|---|---|---|
| 5,406,573 A * | 4/1995 | Ozbay et al. ............ | 372/43.01 |
| 6,134,043 A | 10/2000 | Johnson | |
| 6,358,854 B1 | 3/2002 | Fleming | |
| 6,392,787 B1 | 5/2002 | Cirelli | |
| 2003/0104700 A1 | 6/2003 | Fleming | |
| 2005/0196118 A1 | 9/2005 | Ikemoto | |
| 2005/0207717 A1 | 9/2005 | Takagi | |

FOREIGN PATENT DOCUMENTS

| EP | 1566671 A1 | 8/2005 |
|---|---|---|
| EP | 1574884 A1 | 9/2005 |

OTHER PUBLICATIONS

Eli Yablonovitch, "Inhibited Spontaneous Emission in Solid-State Physics and Electronics", Physical Review Letters, vol. 58, No. 20, pp. 2059-2062, May 18, 1987.
M. Maldovan, E. Thomas and C. Carter, "Layer-by-layer diamond-like woodpile structure with a large photonic band gap", Applied Physics Letters, vol. 84, No. 3, pp. 362-364, 2004.
S. Noda, A. Chutinan and M. Imada, "Trapping and emission of photons by a single defect in a photonic bandgap structure", Nature, vol. 407, pp. 608-610, Oct. 5, 2000.
Reynolds A.L., et al: "Interleaving two-dimensional lattices to create three-dimensional photonic bandgap structures", IEE Proc. Optoelectronics, vol. 145, No. 6, 1998, p. 436-440.

(Continued)

*Primary Examiner*—Michelle Connelly-Cushwa
*Assistant Examiner*—Jerry T. Rahll
(74) *Attorney, Agent, or Firm*—Canon U.S.A., Inc. Intellectual Property Division

(57) ABSTRACT

A three-dimensional photonic crystal operating at a plurality of design wavelengths, in which the photonic band gap can be adjusted to a desired wavelength band without changing the lattice period, and an optical element that can contain a defect resonator or a defect waveguide in the three-dimensional photonic crystal are provided.

20 Claims, 28 Drawing Sheets

OTHER PUBLICATIONS

Xue-Hua Wang, et al: "Large absolute photonic band gaps created by rotating noncircular rods in two-dimensional lattices", Physical Review B, vol. 60, No. 16, 1999, p. 11417-11421.

T. Trifonov, et al: "Effects of symmetry reduction in two-dimensional square and triangular lattices", Physical Review B, vol. 69, 2004, p. 235112-1-235112-11.

* cited by examiner

DISCRETE STRUCTURE 1 LAYER

DISCRETE STRUCTURES 2 LAYERS

DISCRETE STRUCTURES 3 LAYERS

LATTICE PERIOD

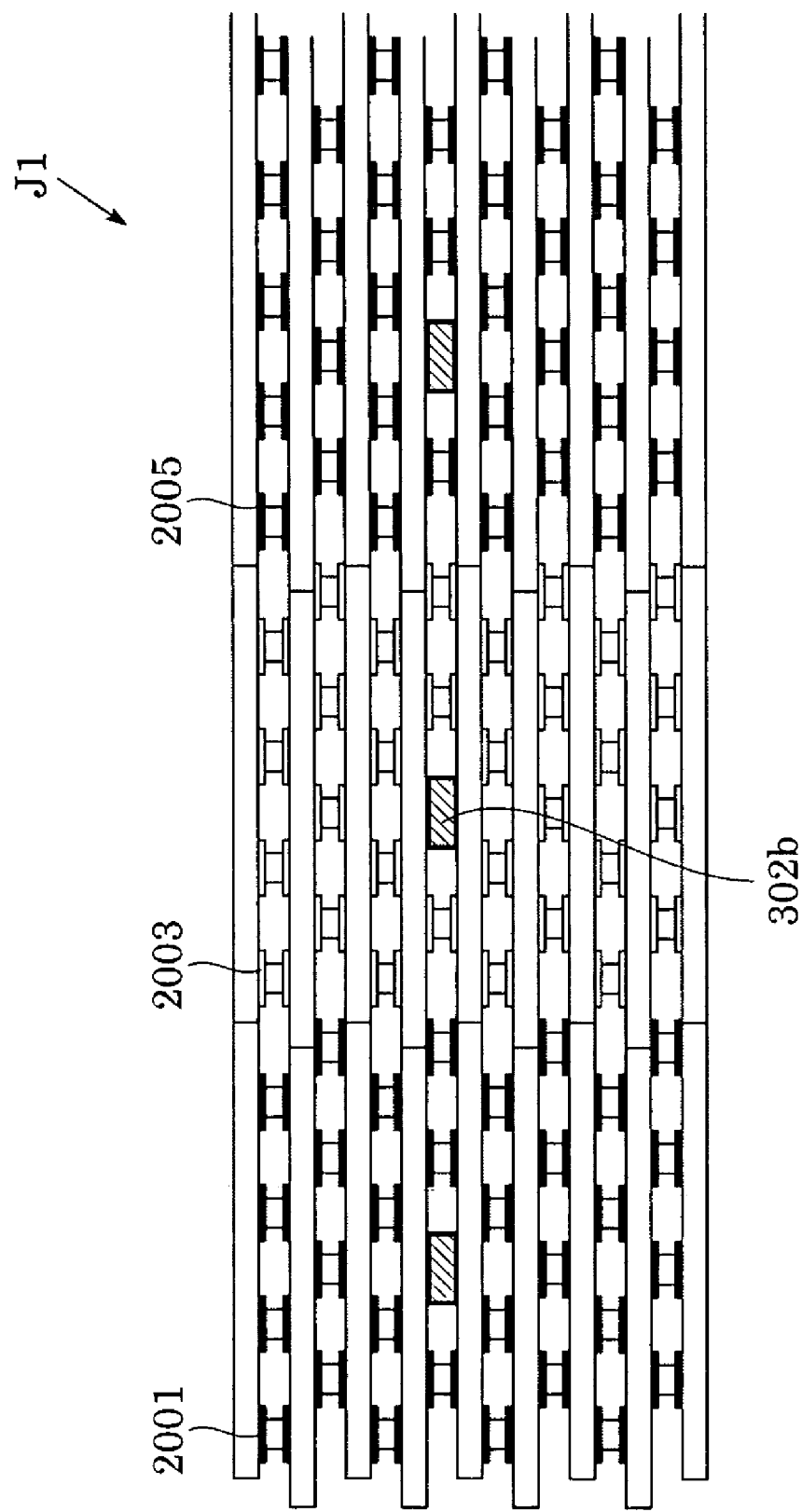

502a  504  503b
503a

INCIDENT
DIRECTION
OF LIGHT 502b  505

RELATED ART

DIAMOND STRUCTURE

WOODPILE STRUCTURE

HELICAL STRUCTURE

THREE-DIMENSIONAL STRUCTURE

INVERSE STRUCTURE

DIAMOND WOODPILE STRUCTURE

FIG. 34A  RELATED ART
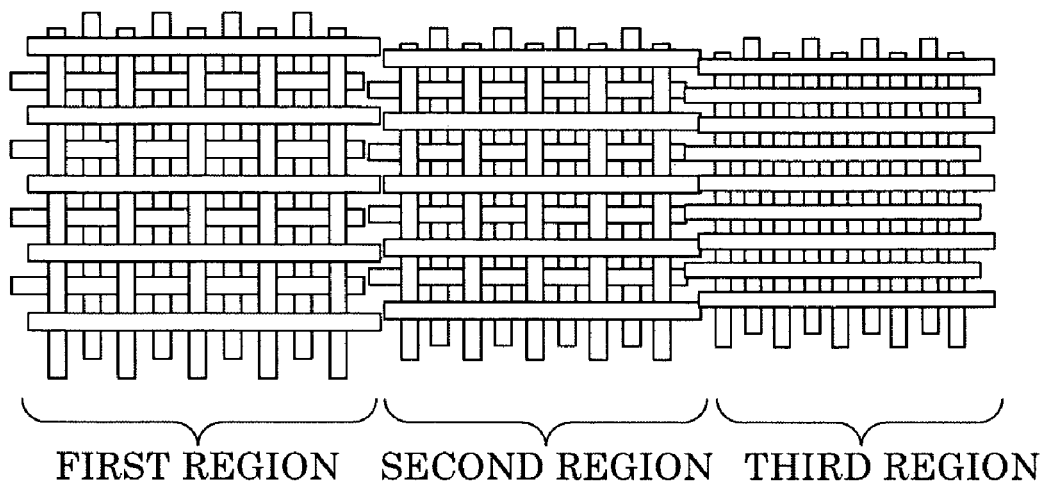
FIRST REGION   SECOND REGION   THIRD REGION
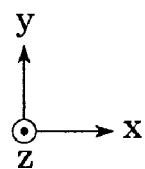
FIG. 34B  RELATED ART
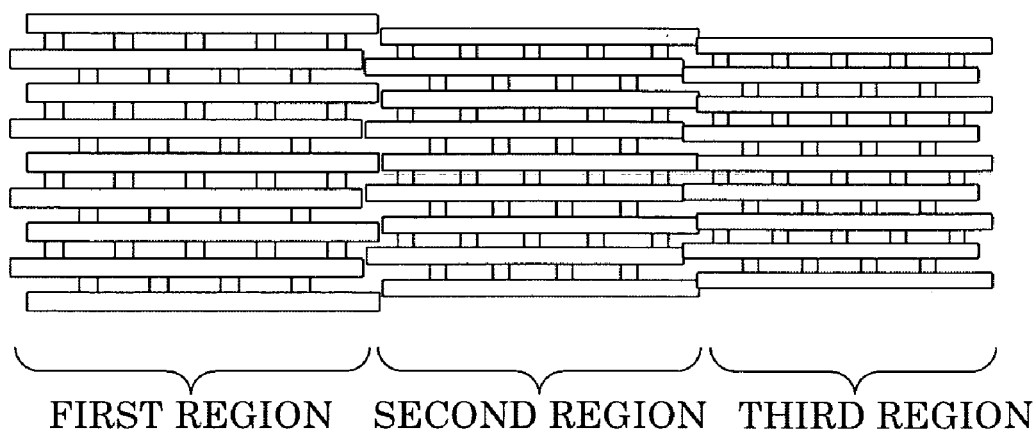
FIRST REGION   SECOND REGION   THIRD REGION
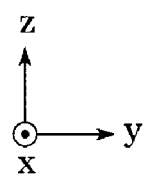

THREE-DIMENSIONAL PHOTONIC CRYSTAL AND OPTICAL ELEMENT

BACKGROUND OF THE INVENTION

1. Field of the Invention

The present invention relates to a three-dimensional photonic crystal, more particularly, though not exclusively, the present invention relates to photonic crystals having designed, defects and/or refractive index periodicity.

2. Description of the Related Art

Yablonovitch proposed the concept that the transmission/reflection characteristics of an electromagnetic wave can be controlled using a structure smaller than the wavelength of the electromagnetic wave (Physical Review Letters, Vol. 58, pp. 2059, 1987). According to this document, a periodic structure smaller than the wavelength can control the transmission/reflection characteristics of the electromagnetic wave. Thus, the transmission/reflection characteristics of light can be controlled when the wavelength of the electromagnetic wave is close to the periodicity of the structure. A photonic crystal can be such a structure.

It has been suggested that a reflecting mirror having a reflectance of 100% (lossless) in a certain wavelength region can be manufactured. This concept that facilitates a reflectance of near 100% in certain wavelength regions, results in a frequency range with a reduced transmissive wavelength power, which is referred to as a photonic band gap, as compared with the energy gap in a conventional semiconductor. Furthermore, a three-dimensional fine periodic structure can provide the photonic band gap for incident light from any direction. This is hereinafter referred to as a complete photonic band gap. The complete photonic band gap can have various applications (e.g., reduced spontaneous emission in a light-emitting device).

For example, a point defect or a linear defect in the three-dimensional photonic crystal can provide a resonator or a waveguide in accordance with a desired wavelength of the photonic band gap. A point defect resonator utilizing the photonic band gap can trap light in a very small region and control the emission pattern of light, where the frequency of the emitted light can lie in the bang gap region. This can achieve an increased performance light-emitting device that efficiently emits light at a desired wavelength. When a point defect resonator is made of a luminescent material, the luminescent material can be excited by any excitation method to generate laser oscillation (U.S. Pat. No. 6,392,787).

A structure that can achieve the complete photonic band gap in a wider wavelength region can facilitate extending the operating wavelength region of such a functional device. Some structures having a photonic band gap have been proposed (U.S. Pat. No. 6,392,787, U.S. Pat. No. 6,134,043, Applied Physics Letters, Vol. 84, No. 3, pp. 362, 2004). FIGS. 33A to 33F illustrate three-dimensional periodic structures that allege to achieve the complete photonic band gap. They are a diamond structure, a woodpile structure, a helical structure, a three-dimensional periodic structure, an inverse structure of the three-dimensional periodic structure, and a diamond woodpile structure.

The photonic band gap in the three-dimensional photonic crystals described above can be controlled by changing the lattice period of the three-dimensional photonic crystals. For example, a larger lattice period shifts the wavelength band of the photonic band gap toward a longer wavelength, and a smaller lattice period shifts the wavelength band of the photonic band gap toward a shorter wavelength.

Noda et al. (Nature, Vol. 407, p. 608, 2000) alleges the control of an operating wavelength by lattice period modulation in an optical multiplexing/demultiplexing circuit (add-drop optical circuit) using a two-dimensional photonic crystal. The optical multiplexing/demultiplexing circuit is an optical input/output circuit that has a (add) function of adding a new wavelength to a medium through which a plurality of wavelengths propagate and a (drop) function of extracting only a certain wavelength from the medium. The photonic crystal is expected to reduce the size of this circuit. This literature alleges that almost the same drop efficiency could be obtained in a plurality of wavelengths by modulating the lattice period to tune the operating wavelength of a waveguide and a resonator to a desired wavelength. The structure in which two-dimensional photonic crystals of different lattice periods are arranged is called an in-plane heterostructure. This example demonstrates that the control of the wavelength band of the photonic band gap can be used for creating an optical nanodevice, which can use a photonic crystal.

However, such a structure having a modulated lattice period cannot be applied directly to the three-dimensional photonic crystal. While it is possible to control the photonic band gap by modulating a lattice period even in the three-dimensional photonic crystal, an incommensurate structure may occur at an interface where the lattice period varies, as shown in FIGS. 34A and 34B. In particularly, it is difficult to produce the three-dimensional structure, because inconsistent lattice periods occur in the x-axis, the y-axis, and the z-axis direction. For example, in a layer-by-layer structure in which layers are stacked one after another (e.g., the woodpile structure), the lattice period varies in the lamination direction. Thus, it is difficult to utilize the conventional repetition of structure patterning by electron beam lithography and the lamination, a conventional wafer-fusion technique, or a conventional nanoimprint process without any modification.

Accordingly, it can be difficult to have a conventional three-dimensional photonic crystal operating at a plurality of design wavelengths in which the photonic band gap can be adjusted to a desired wavelength band without changing the lattice period.

SUMMARY OF THE INVENTION

At least one exemplary embodiment relates to a three-dimensional photonic crystal comprising:

a first layer including a plurality of columnar structures spaced apart by a predetermined interval;

a second layer including a plurality of columnar structures spaced apart by a predetermined interval, the columnar structures extending in a direction different from that of the columnar structures in the first layer;

a third layer including a plurality of columnar structures spaced apart by a predetermined interval, the columnar structures extending in substantially the same direction as that of the columnar structures in the first layer;

a fourth layer including a plurality of columnar structures spaced apart by a predetermined interval, the columnar structures extending in the same direction as that of the columnar structures in the second layer; and additional layers, each including at least one layer containing discrete structures disposed discretely in a plane substantially parallel to each of the first through fourth layers, wherein the first to fourth layers are stacked sequentially with the additional layer adjacent to at least two of the first, the second, the third, and the fourth layer, wherein the first layer and the third layer are stacked such that the columnar structures in the first layer and the third layer are mutually shifted by about one-half the first predetermined interval in a direction substantially perpendicular to the direction of the extension of the columnar structures of the first layer, wherein the second layer and the fourth layer are stacked such that the columnar structures in the second layer and the fourth layer are mutually shifted by about one-half the second predetermined interval in a direction substantially perpendicular to the direction of the extension of the columnar structures of the second layer, wherein discrete structures contained in the additional layers are disposed at positions corresponding to the intersections of adjacent columnar structures of stacked layers, and the three-dimensional photonic crystal contains at least two regions of different discrete structures.

Further features of the present invention will become apparent from the following description of exemplary embodiments with reference to the attached drawings.

BRIEF DESCRIPTION OF THE DRAWINGS

FIG. 20 illustrates a schematic view of a point defect resonator made of a three-dimensional photonic crystal having a plurality of regions containing discrete structures different in refractive index.

FIGS. 34A and 34B illustrate a top view and a side view, respectively, of a three-dimensional photonic crystal of a conventional lattice period modulation type.

DESCRIPTION OF THE EMBODIMENTS

EXAMPLE 1

The following description of at least one of the possible exemplary embodiment(s) is merely illustrative in nature and is in no way intended to limit the invention, its application, its equivalents, or uses.

Processes, techniques, apparatus, and materials as known by one of ordinary skill in the art may not be discussed in detail but are intended to be part of the enabling description where appropriate. For example some examples of photonic crystal formation are discussed, equivalents and other photonic crystal configurations and materials used, as known by one of ordinary skill in the relevant arts, are intended to be included in the scope of at least a few exemplary embodiments.

Additionally, the actual size of structures may not be discussed however any size from macrometer (centimeter to meters) to nanometer and below sized photonic crystal structures are intended to lie within the scope of exemplary embodiments (e.g., photonic structures with characteristic sizes of individual molecules, nanometer size, micro size, centimeter, and meter sizes).

Additionally, exemplary embodiments are not limited to visual optical systems; photonic crystal structures can be constructed for use with infrared and other wavelength systems. For example an infrared light detector (e.g., a detector measuring infrared markings).

Figure 1:
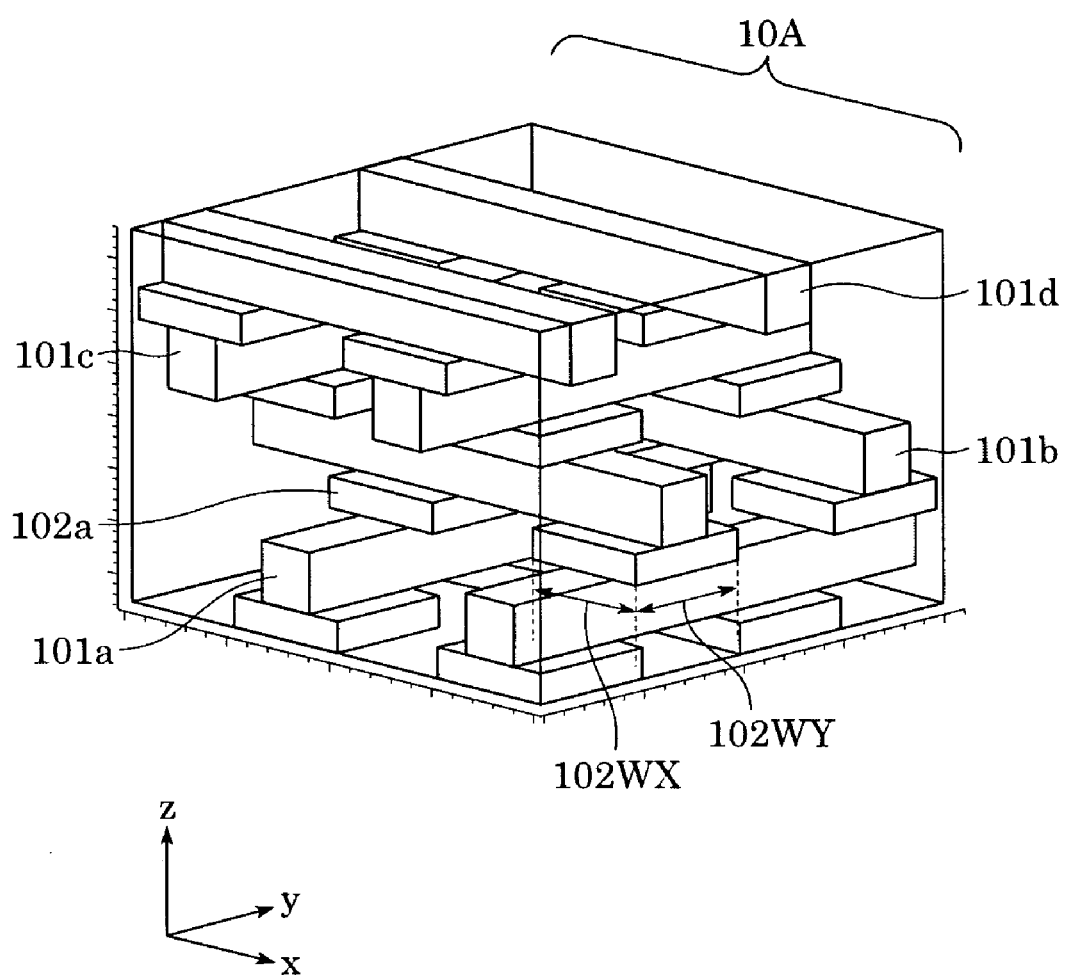
FIG. 1 illustrates a schematic view of a three-dimensional photonic crystal A according to an exemplary embodiment.
Figure 2:
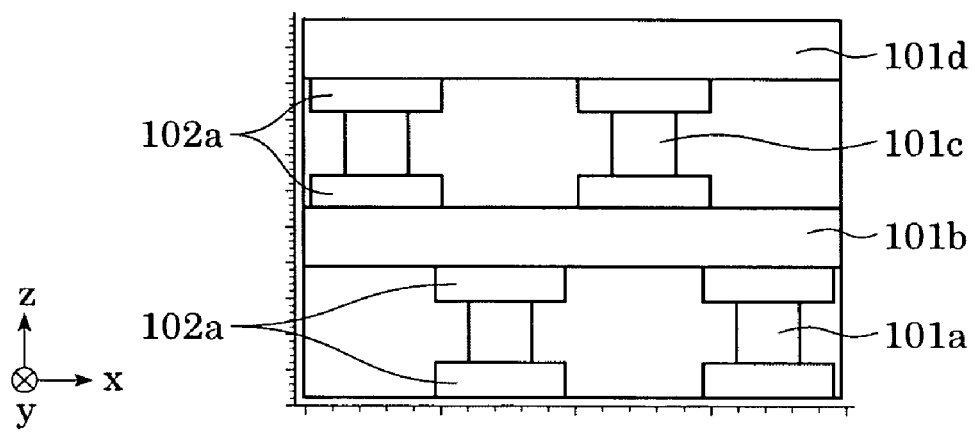
FIG. 2 illustrates a top view of the three-dimensional photonic crystal A.
Figure 3:
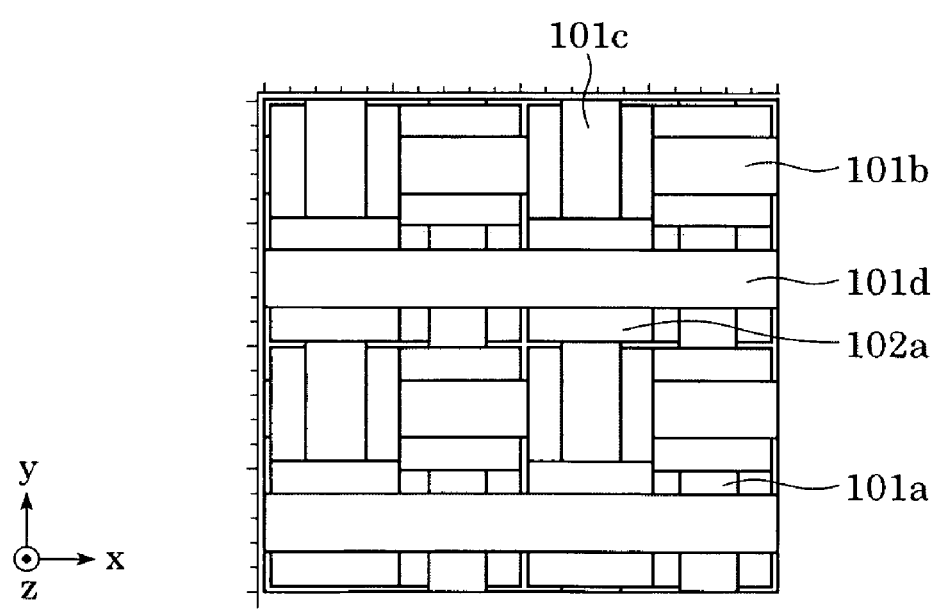
FIG. 3 illustrates a side view of the three-dimensional photonic crystal A.

FIGS. 1, 2, and 3 illustrate a schematic view, a side view, and a top view, respectively, of a three-dimensional photonic crystal 10A according to an exemplary embodiment. These figures show only part of the periodic structure, which can have a repetitive periodic structure in the x-axis, the y-axis, and the z-axis directions. Schematic views described below can have similar periodicity.

Figure 4:
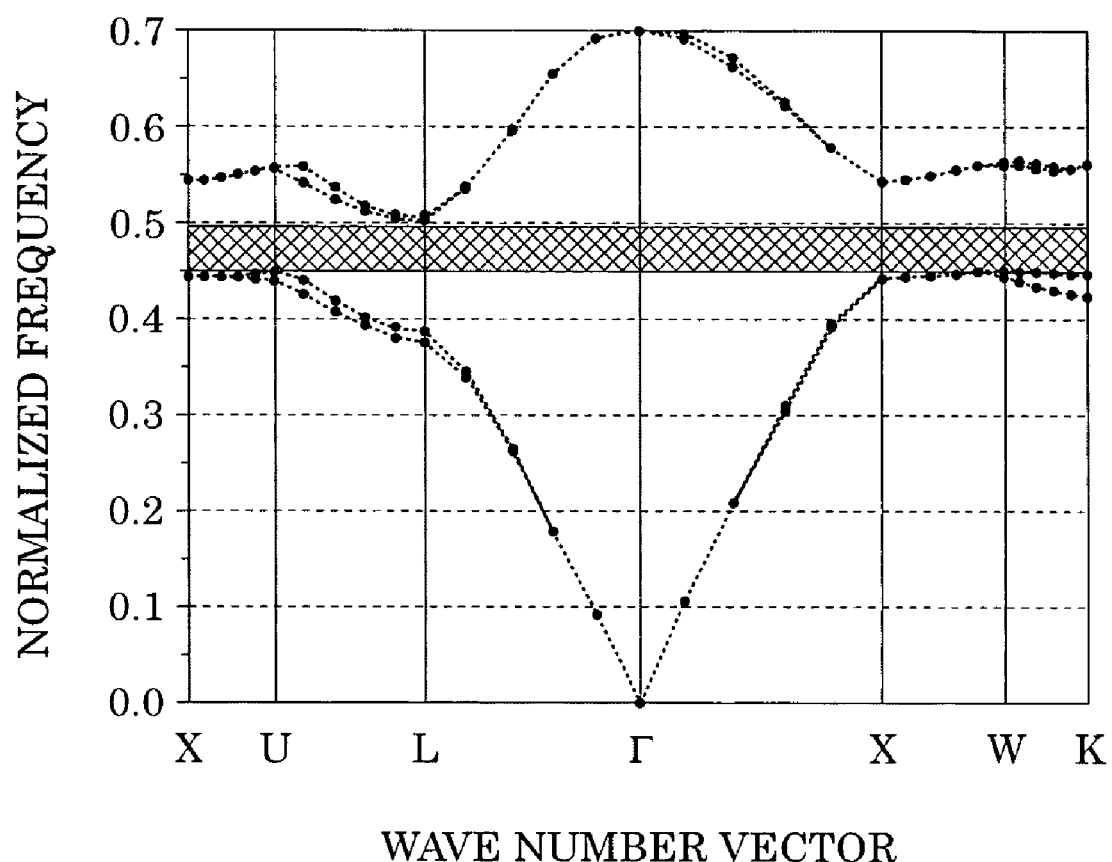
FIG. 4 illustrates a graph of the photonic band structure of the three-dimensional photonic crystal A.

As illustrated in FIG. 1, a three-dimensional photonic crystal 10A can include four rods (101a, 101b, 101c, and 101d) crossing each other and discrete structures 102a having a horizontal cross section (e.g., square) between the rods. In the structure of the three-dimensional photonic crystal A, the rods can have various dimensions (e.g., a width of 0.25355a, a thickness of 0.25355a, where "a" denotes the lattice period), and the discrete structures can also have various dimensions (e.g., a thickness of 0.10a and a width of 0.50a). The photonic band gap can be calculated (e.g., by a plane-wave expansion method) to yield the photonic band structure as shown in FIG. 4. The horizontal axis represents a wave number vector, that is, the incident direction of the electromagnetic wave that enters the photonic crystal. For example, a K point indicates the wave number vector parallel to the x-axis (or y-axis). An X point indicates the wave number vector in the xy-plane at an inclination of 45 degrees from the x-axis (or y-axis). On the other hand, the vertical axis represents the frequency normalized by the lattice period. In a normalized frequency band indicated by hatching, a photonic band gap (PBG) where light cannot be present at any incident direction is formed.

Figure 5:
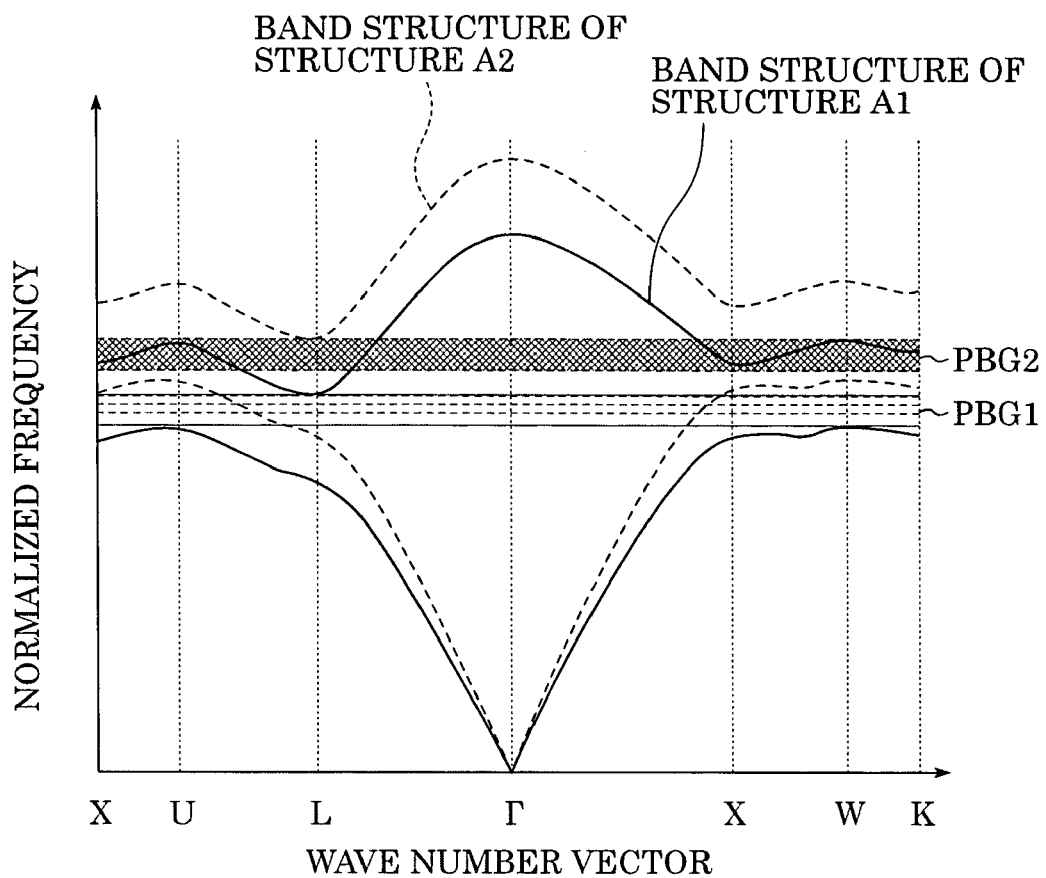
FIG. 5 illustrates a graph of photonic band structures of three-dimensional photonic crystals A1 and A2 having different additional layer widths.
Figures 6A, 6B, 6C, 6D, 6E:
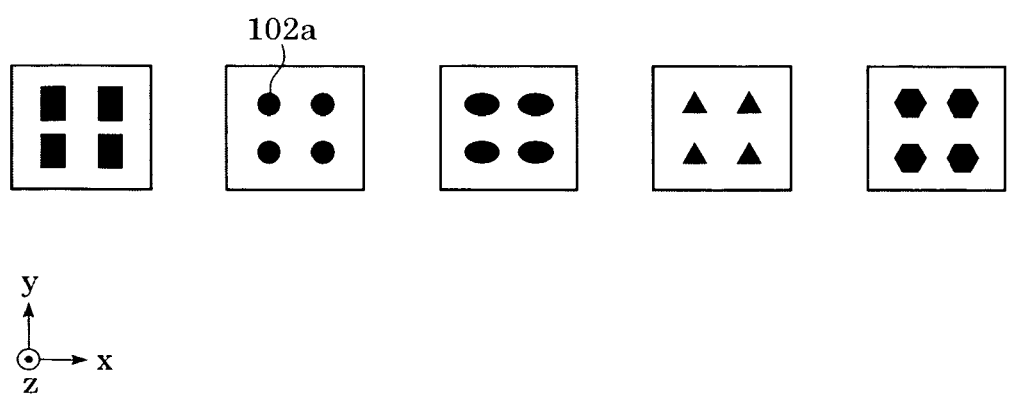
FIGS. 6A to 6E illustrate top views of discrete structure variations.

In at least one exemplary embodiment, the width (e.g., 101WX and 101WY; FIG. 1) of the discrete structure 102a can be changed while the width and the thickness of the rod, the lattice period, the thickness and the refractive index of the discrete structure are held substantially constant. In other exemplary embodiments, at least one of the other factors can additionally or alternatively be changed (e.g., the width and the thickness of the rod, the lattice period, the thickness and the refractive index of the discrete structure). Changing the widths 102WX and 102WY, can change the filling factor of a dielectric medium constituting a three-dimensional structure in a unit periodic structure. This, in turn, can change the effective refractive index of the entire three-dimensional photonic crystal, and also can change the photonic band gap. Thus, in at least one exemplary embodiment, the photonic band gap can be controlled by changing the width (e.g., 102WX and 102WY) of the discrete structure 102a. This situation will be described with reference to the photonic band chart illustrated in FIG. 5.

The band structure of a three-dimensional photonic crystal A1 is indicated by the solid line, while the band structure of a three-dimensional photonic crystal A2 is indicated by the dotted line. The photonic band gaps generated by the respective structures are indicated by PBG1 and PBG2. The photonic crystal A1 and the photonic crystal A2 differ only in the discrete structure. When the cross-sectional area of the discrete structure in the xy-plane is expressed by the product of the width in the x-axis direction (e.g., 102WX) and the width in the y-axis direction (e.g., 102WY) of the discrete structure, the cross-sectional area of the discrete structure in the photonic crystal A2 is smaller than that in the photonic crystal A1. A smaller cross-sectional area of the discrete structure in the xy-plane results in a smaller effective refractive index of the three-dimensional photonic crystal, shifting the frequency at which the photonic band gap can operate at a higher frequency. Thus, the wavelength band of the photonic band gap can be controlled by changing the width of the discrete structures.

Figure 12A:
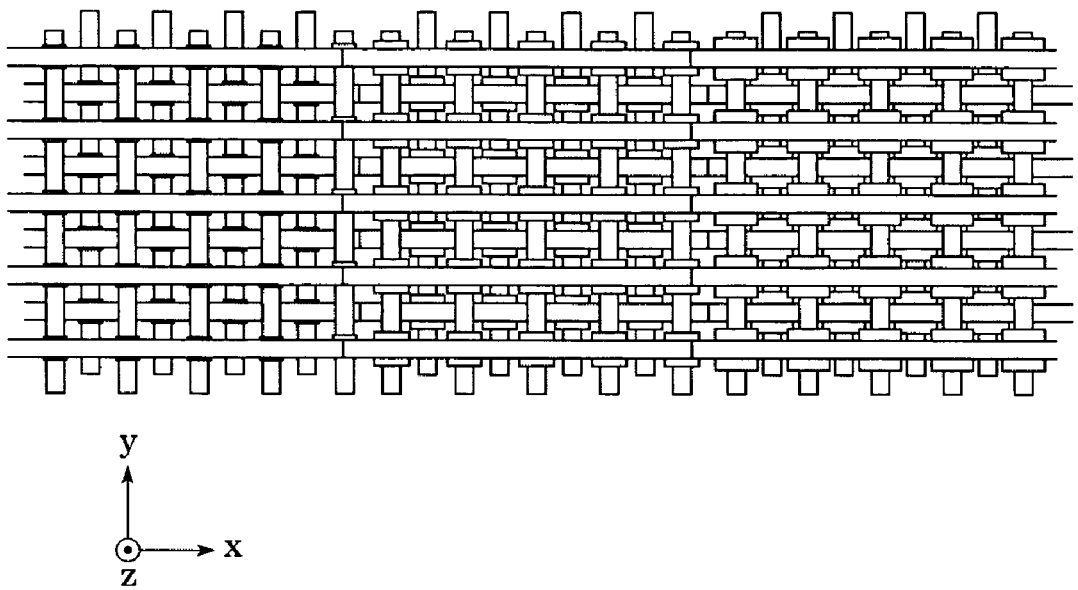
FIGS. 12A and 12B illustrate a top view and a side view, respectively, of a monolithic structure according to an exemplary embodiment.
Figure 12B:
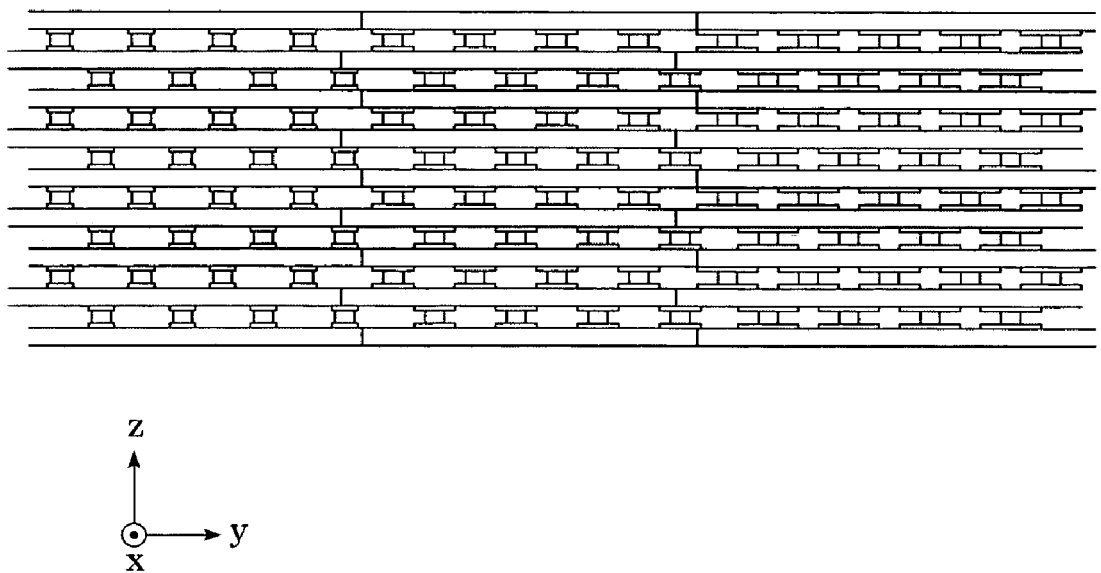

Furthermore, the discrete structures can have different sizes or shapes and may be disposed in a plurality of regions (e.g., FIGS. 12A and 12B). This facilitates control of the wavelength band of the photonic band gap without having to change the lattice period, thus facilitating the manufacturing of photonic crystals in accordance with exemplary embodiments.

Figure 7D:
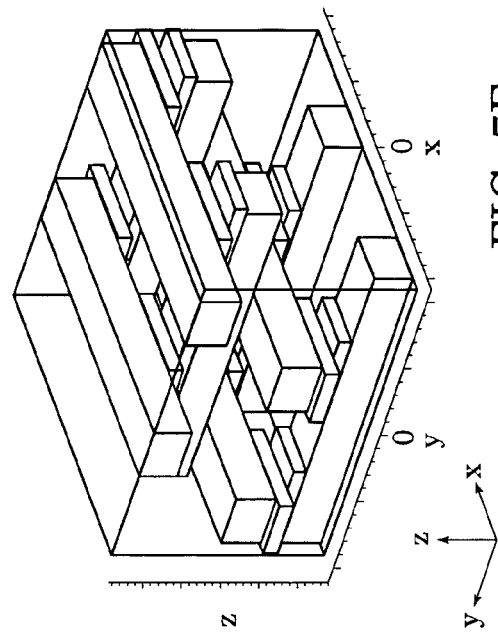
FIGS. 7A to 7C and 7E illustrate side views of three-dimensional photonic crystals having different numbers of discrete structures and FIG. 7D illustrates a perspective view of a three-dimensional photonic crystal.
Figure 7E:
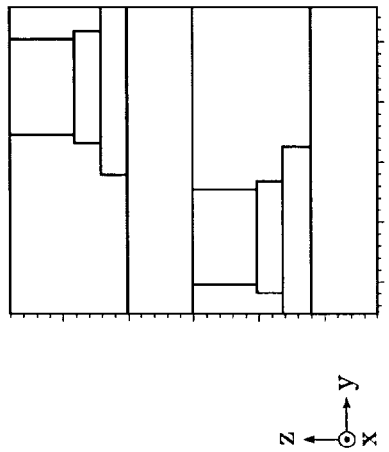
Figure 7A:
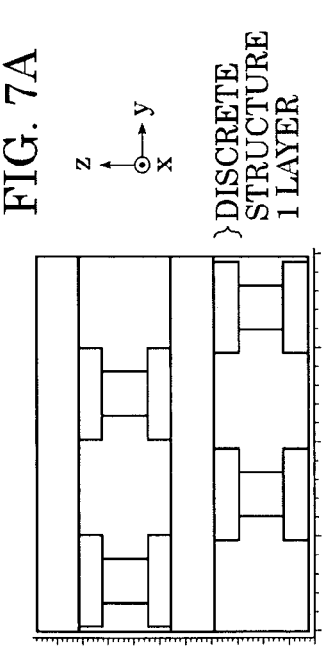
Figure 7B:
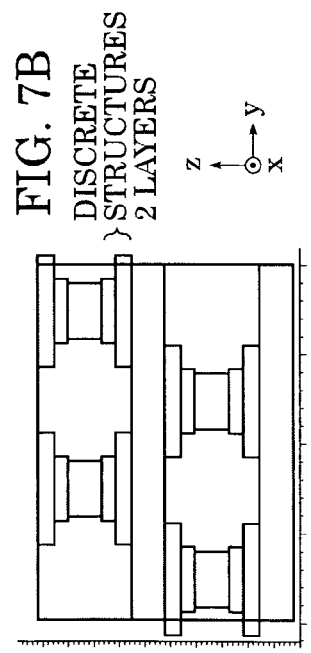
Figure 7C:
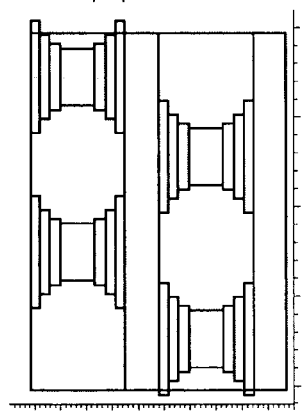

While the exemplary embodiment of the three-dimensional photonic crystal 10A illustrated in FIG. 1 includes only one discrete structure-containing layer, further exemplary embodiments can have a plurality of layers of discrete structures (e.g., FIGS. 7A–7E). Although the three-dimensional photonic crystal 10A can contain four or more discrete structure-containing layers, the manufacturing process can get more complicated as the number of layer increase. Thus, the number of discrete structure-containing layers depends on the application. Furthermore, the cross section of the discrete structure (e.g., 102a) in the xy-plane is not limited to square, but may be any shape, (e.g., rectangular, circular, elliptic, triangular, and polygonal, as shown in FIGS. 6A–6E). In addition, the same effect can be achieved by disposing the discrete structure-containing layer on only one side as illustrated in FIG. 7E. In this case, the number of discrete structure-containing layers may also be one, two, three, or more. Although the cross-sectional views in the Z-X and Z-Y planes show rectangular structures for the discrete structures, the cross sections (e.g., 82 and 84 of FIG. 8A) can be of various shapes (e.g., trapezoidal, flat top pyramid, flat top conical). Numerical examples including two or three discrete structure-containing layers will be described below more specifically.

Figure 8A:
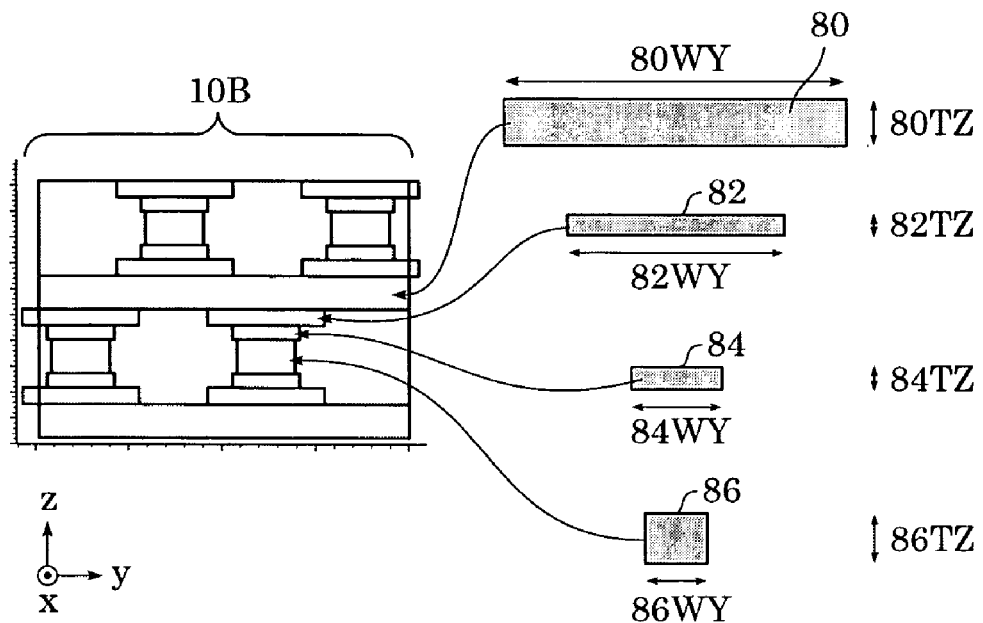
FIG. 8A illustrates a schematic view of a three-dimensional photonic crystal B and FIG. 8B illustrates a graph showing a relationship between the width of the additional layer and the center wavelength of the photonic band gap.

FIG. 8A illustrates a schematic view of a three-dimensional photonic crystal 10B in accordance with an additional exemplary embodiment. The three-dimensional photonic crystal 10B has a structure including two discrete structure-containing layers (e.g., 82 and 84). Dimensions and properties of the various elements (e.g., 80, 82, 84, 86) of the photonic crystal 10B can vary; in this particular example, the refractive indices of the rod and the discrete structure are 2.5, the lattice period is 250 nm, the width of the rod is 62.5 nm (e.g., 86WY), and the thickness of the rod is 75 nm (e.g., 86TZ). In the three-dimensional photonic crystal 10B, the width of the first discrete structure 84 in the x-axis direction (out of page) is equal to the width 82WY of a second discrete structure 82 in the y-axis direction. The width 84WY of the first discrete structure 84 in the y-axis direction is equal to the width of the second discrete structure 82 in the x-axis direction.

Figure 8B:
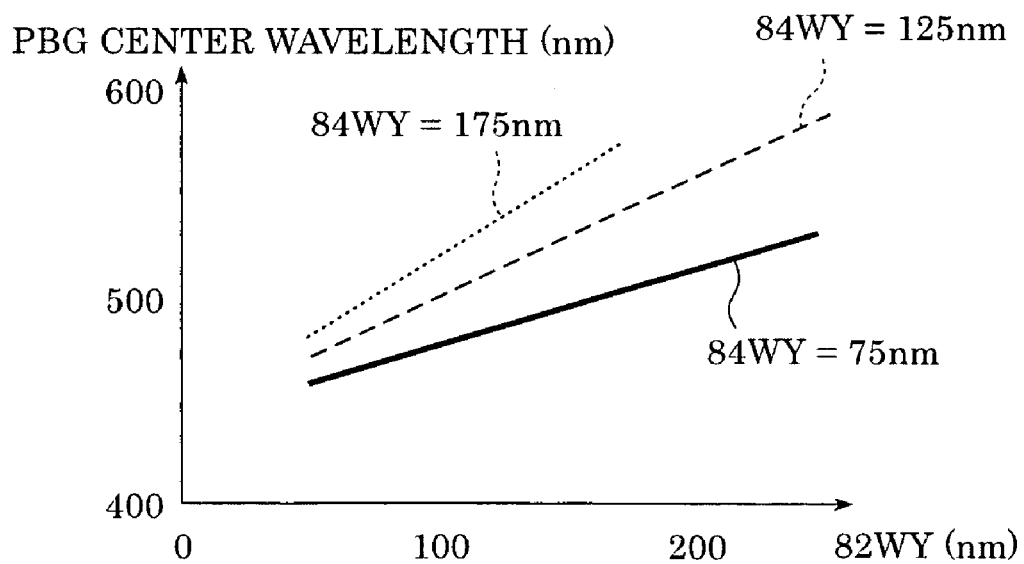

In the graph shown in FIG. 8B, the horizontal axis represents the width 82WY of the second discrete structure 82, and the vertical axis represents the center wavelength of the photonic band gap (PBG). Three lines, solid, dashed, and dotted, correspond to the width 84WY of the first discrete structure 84 of 75 nm, 125 nm, and 175 nm respectively. The center wavelength of the photonic band gap shifts to the longer wavelength side with increasing width 82WY of the second discrete structure 82. Variations in the width of the discrete structure change the filling factor (volume) of a dielectric medium per unit volume. A larger filling factor can increase the effective refractive index of the three-dimensional photonic crystal, shifting the center wavelength of the photonic band gap to the longer wavelength side. Thus, a center wavelength of the photonic band gap can be determined by appropriately designing the width of the discrete structure. The first discrete structure 84 or the second discrete structure 82 can be of any size.

Figure 9A:
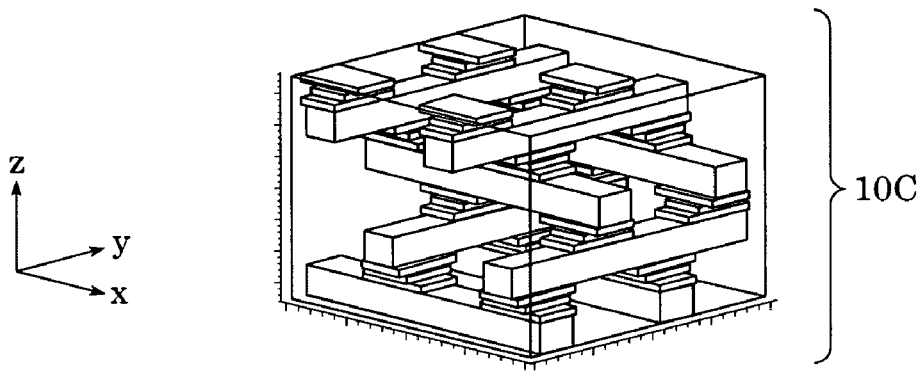
FIGS. 9A to 9C illustrate a perspective view, a top view, and a side view, respectively, of a three-dimensional photonic crystal, showing a relationship between the photonic band gap and the resonant wavelength.
Figure 9B:
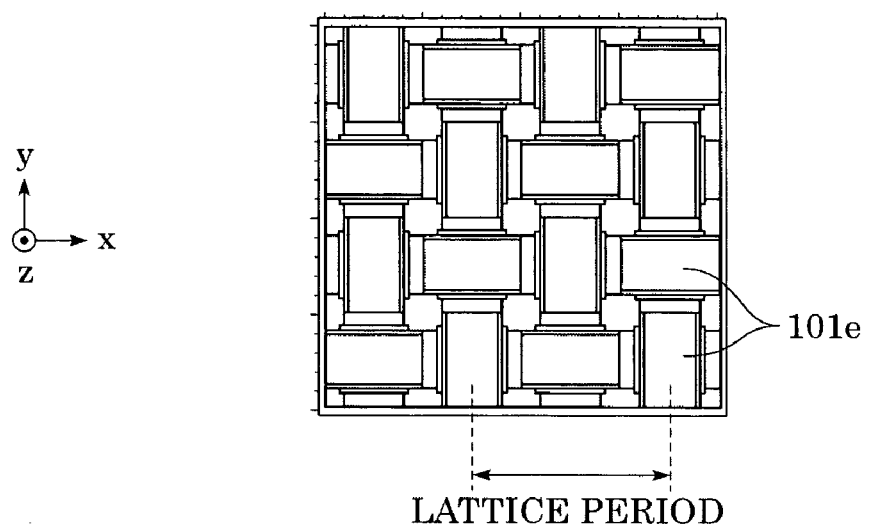
Figure 9C:
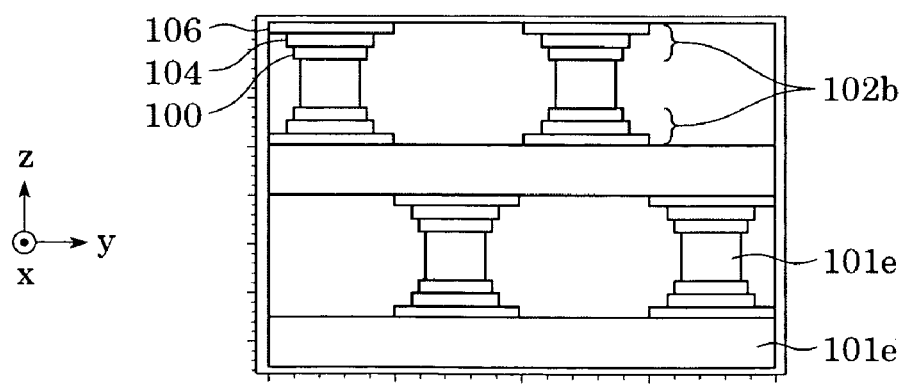
Figure 10:
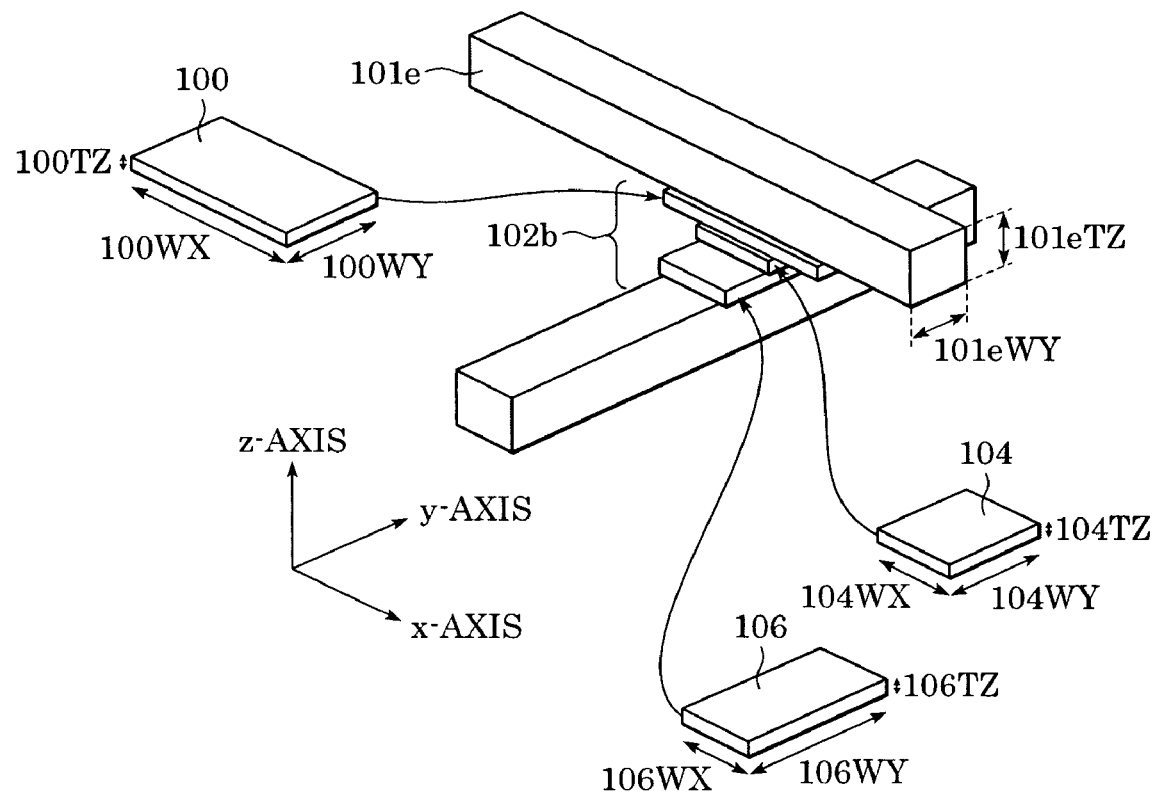
FIG. 10 illustrates a detail view of three additional layers.

FIGS. 9A to 9C illustrate schematic views of a three-dimensional photonic crystal 10C having three discrete structure (102b)-containing layers (100, 104, 106). The three-dimensional photonic crystal 10C may have at least three discrete structure-containing layers. The three-dimensional photonic crystal 10C can have various dimensions, however the particular example illustrated (FIGS. 9A–9C; FIG. 10) has the following dimensions: the width 101eWY of rod 101e is 0.174a; the thickness 101eTZ of rod 101e is 0.174a; the width 106WX of a first discrete structure 106 is 0.187a; the width 106WYv of the first discrete structure 106 is 0.400a; the thickness 106TZ of the first discrete structure 106 is approximately 0.040a; the width 104WX of a second discrete structure 104 the width 104WY of the second discrete structure 104 of 0.200a; the thickness 104TZ of the second discrete structure 104 is 0.040a; the width 100WX of a third discrete structure 100 is 0.400a; the width 100WY of the third discrete structure 100 is 0.187a; and the thickness 100TZ of the third discrete structure 100 is 0.040a, where the refractive indices of the rods (e.g., 101e) and the discrete structures (e.g., 100, 104, and 106) are 2.5 and "a" denotes the lattice period. The cross sections of the first discrete structure 106 and the third discrete structure 100 in the xy-plane can be rectangular, and the cross section of the second discrete structure 104 in the xy-plane can be square (FIG. 10).

The three-dimensional photonic crystal 10C can satisfy the following mathematical relation:

$$106WX = 100WY = [(\text{lattice period}) - 104WX]/2; \quad \text{(equation 1)}$$

$$106XY = 100WX = (104WX + 101eWY)/2; \quad \text{(equation 2)}$$

$$106TZ = 104TZ = 100TZ; \text{ and} \quad \text{(equation 3)}$$

$$101eTZ = \sqrt{2}a/4 - [(106TZ) + (104TZ) + (100TZ)]. \quad \text{(equation 4)}$$

Figure 11:
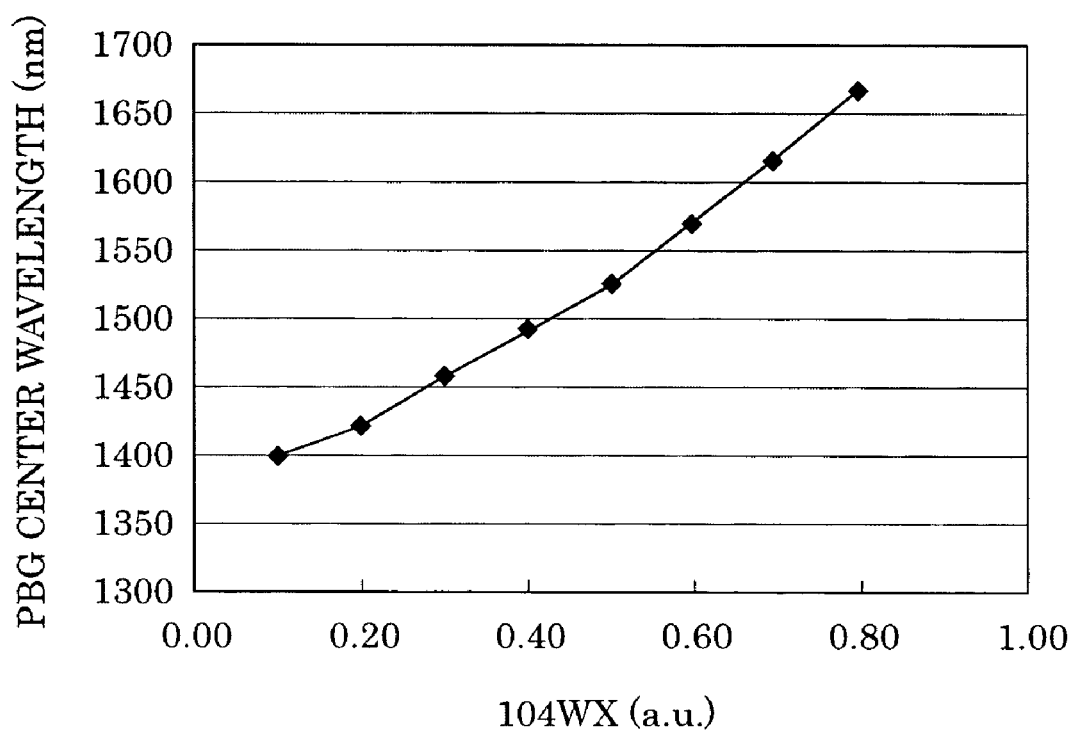
FIG. 11 illustrates a graph showing the center wavelength of the photonic band gap as a function of the width of a second additional layer.

FIG. 11 illustrates the center wavelength of the photonic band gap as a function of the width 104WX of the second discrete structure 104 when the lattice period "a" is 720 nm. The center wavelength of the photonic band gap can be adjusted between 1400 nm and 1670 nm by changing the discrete structure 102b. The filling factor of the dielectric medium per unit volume can increase with increasing width 104WX of the second discrete structure 104. This also increases the effective refractive index of the three-dimensional periodic structure, thus shifting the center wavelength of the photonic band gap to the longer wavelength side (FIG. 11). The photonic band gap depends on the difference per unit volume between the fraction of the electric field strength concentrated in the medium constituting the rod and the discrete structure in the additional layer and the fraction of the electric field strength concentrated in the other medium. When this difference is larger, the photonic band gap become wider. Three discrete structure-containing layers increase the difference in the fractions of the electric field strengths concentrated in the media particularly in the oblique direction (for example, an L direction in FIG. 4), resulting in a wider photonic band gap.

In this example, the photonic band gap can be controlled using the width 104WX of the second discrete structure 104 as a parameter, and the photonic band gap may be controlled using the width 106WX of the first discrete structure 106 or the width 100WX of the third discrete structure 100 as a parameter.

Furthermore, while rectangular rods 101 are illustrated in the three-dimensional photonic crystals 10A, 10B, and 10C, prisms, cylinders, elliptic cylinders, polygonal columns, other shapes and materials as known by one of ordinary relevant skill and equivalents can be used. As illustrated in FIGS. 6A–6E, while rectangular parallelepipeds are used as the discrete structures 102b, the cross sections of the discrete structures 102a and 102b in the xy-plane may be any shape, including rectangular, circular, elliptic, triangular, and polygonal.

Furthermore, while the rods 101a–e are substantially orthogonally disposed in the x-axis direction and the y-axis direction, the angle between the x-axis and the y-axis may also be anything other than 90 degrees. In addition, the spaces between the rods parallel to the x-axis may be different from the spaces between the rods parallel to the y-axis. Such variations can facilitate the design of photonic crystals for improving the performance (e.g., reflectance, transmission) of light entering at a predetermined angle and/or obtaining an anisotropic structure. While the rods 101a–e and the discrete structures 102a–b can be made of the same medium, they may also be made of different media.

The rods (e.g., 101a–e) according to the present example (e.g., FIGS. 1 and 9a–9C) are disposed at a predetermined interval with a lattice period of "a." In addition, the rods 101a are disposed at 0.5a ("a" denotes the lattice period) away in the x-axis direction from the rods 101c. In the same manner, the rods 101b are disposed at 0.5a away in the y-axis direction from the rods 101d. In such a configuration, the rectangular parallelepipeds between the rods correspond to the lattice positions in a diamond lattice. Thus, a wide photonic band gap can be obtained. The amount of horizontal (x and y direction) shift of the rods may be in the range of 0.25a to 0.75a, or in the range of 0.3a to 0.7a, or in the range of 0.4a to 0.6a. However, in at least one exemplary embodiment, the rods 101a–d can overlap vertically (in the z-direction).

Since the photonic band gap results from the refractive index distribution in the crystal, a combination of media having a larger refractive index ratio can produce a wider photonic band gap. Media constituting the rods (e.g., 101a–e) and the discrete structures (e.g., 102a–b) can be of various refractive indices, for example one can use a high-refractive-index material (e.g., Si, GaAs, InP, Ge, TiO$_2$, GaN, Ta$_2$O$_5$, NB$_2$O$_5$). Moreover, the medium constituting the rods (e.g., 101a–e) and the discrete structures (e.g., 102a–b) can be a transparent material having no absorption in the operating wavelength band of the photonic band gap. The medium other than that constituting the rods (e.g., 101a–e) and the discrete structures (e.g., 102a–b) can be a dielectric (e.g., SiO$_2$), a high-molecular organic material (e.g., PMMA), or a low-refractive-index material, (e.g., air or water).

In view of the process for producing the three-dimensional photonic crystal, the medium other than that constituting the rods (e.g., 101a–e) and the discrete structures (e.g., 102a–b) can be solid. The solid medium can increase the strength of the three-dimensional structure during processing (e.g., mask patterning, etching, polishing, or wafer fusion) of the rods (e.g., 101a–e) and discrete structures (e.g., 102a–b), and thereby facilitate the formation of a desired shape to the three-dimensional structure.

In the three-dimensional photonic crystals 10A, 10B, and 10C according to exemplary embodiments, the center wavelength of the photonic band gap can be controlled, regardless of the number of discrete structure-containing layers, while a lattice period in the xz-plane and a lattice period in the xy-plane can be kept constant (e.g., FIGS. 12A and 12B). Although, in other exemplary embodiments, the lattice period in these planes can vary while others are constant. Since exemplary embodiments can have a constant lattice period, a conventional manufacturing procedure (e.g., patterning a series of structures using, electron beam lithography and lamination, a wafer-fusion technique, or a nanoimprint process) can be used. Additionally, a single manufacturing process/operation can be used to generate a structure operating at a plurality of design wavelengths. Thus facilitating the alignment of elements and productivity.

EXAMPLE 2

Figure 13:
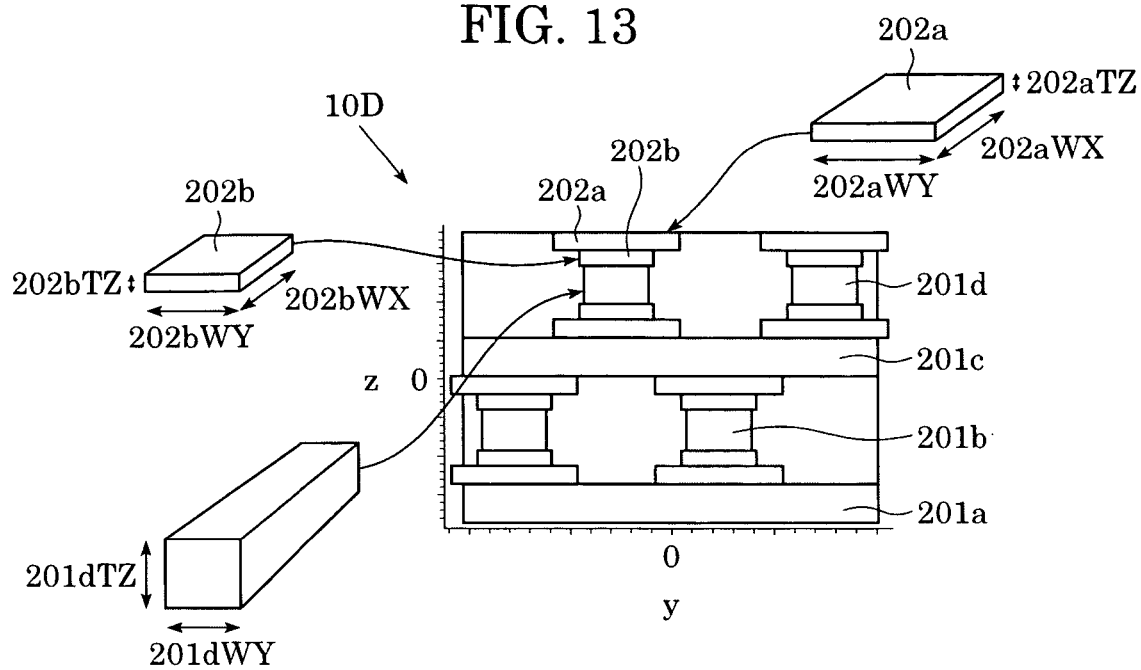
FIG. 13 illustrates a schematic view of a three-dimensional photonic crystal D according to an exemplary embodiment.

FIG. 13 illustrates a schematic view of a three-dimensional photonic crystal 10D according to at least one exemplary embodiment. In the three-dimensional photonic crystal 10D, a medium constituting discrete structures (202a and 202b) can have a refractive index different from that of a medium constituting rods (201a, 201b, 201c, and 201d).

Figure 14:
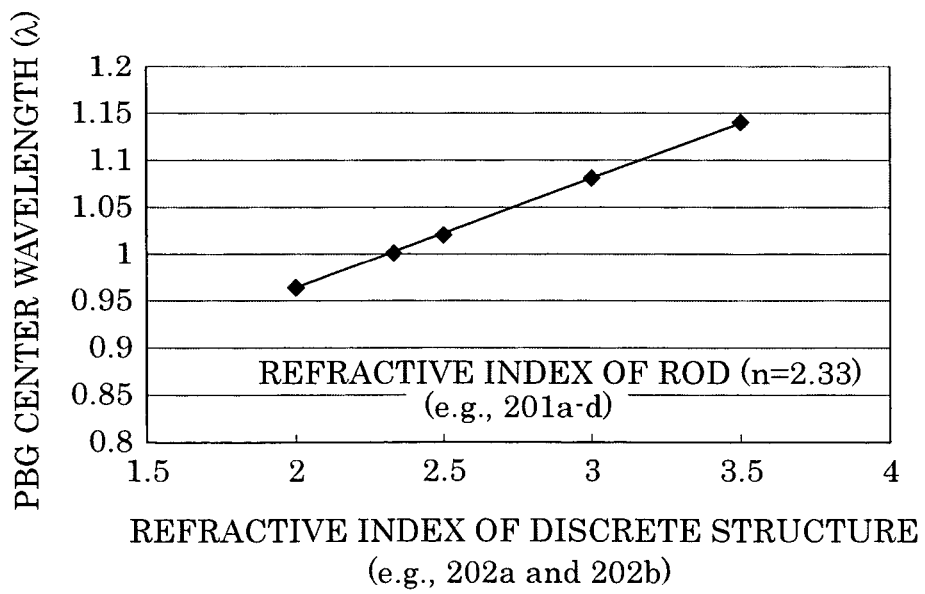
FIG. 14 illustrates a graph showing a relationship between the refractive index of the discrete structure and the center wavelength of the photonic band gap.

FIG. 14 illustrates the change in the center wavelength of the photonic band gap as a function of the refractive index of the medium constituting the discrete structures (e.g., 202a–b) while the shapes and sizes of the rods or the discrete structures constituting the three-dimensional photonic crystal 10D are kept constant. The horizontal axis represents the refractive index of the medium constituting the discrete structures (e.g., 202a–b). The vertical axis represents the center wavelength of the photonic band gap normalized by the center wavelength of the photonic band gap when the rods have the same refractive index as the discrete structures.

In the exemplary embodiment illustrated by example 2, the structural parameters, expressed using the lattice period "a", are as follows: the width of the rod (e.g., 201dWY) is approximately 0.31a; the thickness of the rod (e.g., 201dTZ) is approximately 0.173553a; the thickness of a first discrete structure (e.g., 202bTZ) is approximately 0.09a; the width of the first discrete structure in the x-direction (e.g., 202bWX) is approximately 0.37a; and the width of the first discrete structure in the y-direction (e.g., 202bWY) is approximately 0.66a. In example 2 the thickness of the first discrete structure 202bTZ=the thickness of the second discrete structure 202aTZ, the width of the first discrete structure 202bWX=the width of the second discrete structure 202aWY, and the width of the first discrete structure 202bWY=the width of the second discrete structure 202aWX.

The effective refractive index of the three-dimensional photonic crystal changes when the refractive index of the medium constituting the discrete structures and/or rods changes. Thus, as illustrated in FIG. 14, the center wavelength of the photonic band gap can be controlled by changing the refractive index parameter of the medium constituting the discrete structure (e.g., 202a–b).

Figure 15:
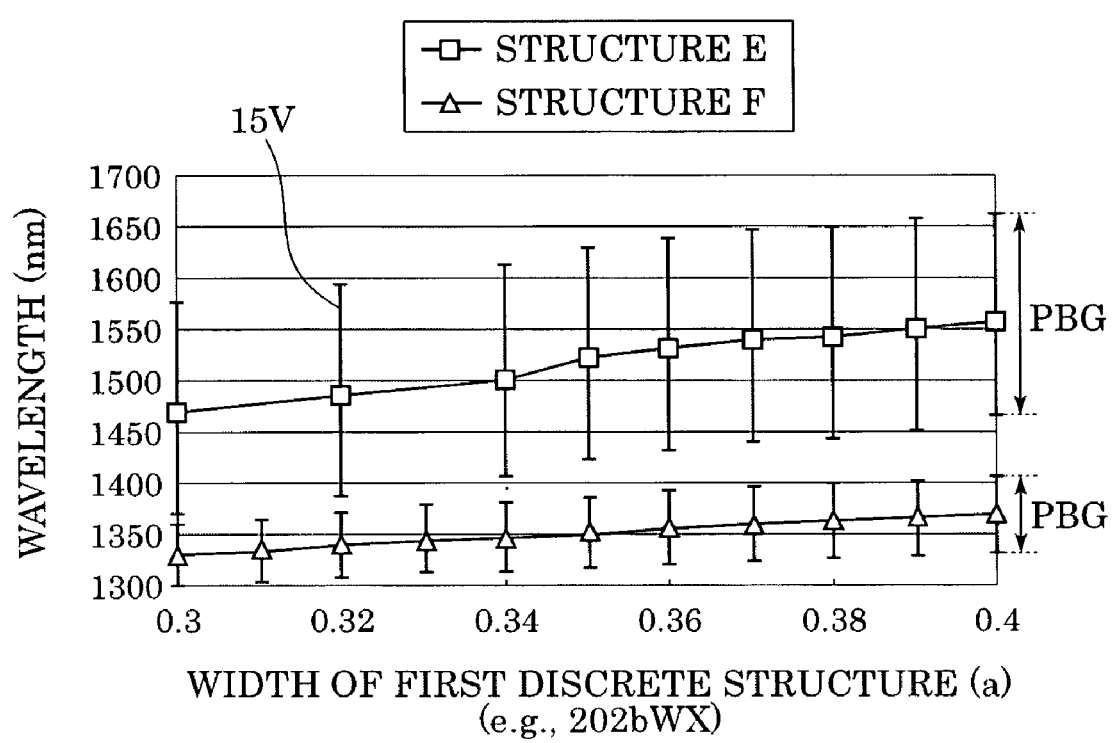
FIG. 15 illustrates a graph showing a relationship between the refractive index and the shape of the discrete structure and the center wavelength of the photonic band gap.

Additionally, the center wavelength of the photonic band gap can be controlled by a combination of the parameters of the refractive index of the medium constituting the discrete structure and the shape or the size of the discrete structures. FIG. 15 illustrates the center wavelength of the photonic band gap as a function of a combination parameter of the refractive index and the shape of the first discrete structure (e.g., 202b). The vertical axis represents the center wavelength of the photonic band gap and the horizontal axis represents the width (e.g., 202bWX) of a first discrete structure. In this particular non-limiting example the material constituting the rod (e.g., 201d) can have a refractive index of 2.33. The medium constituting the discrete structure can have a refractive index of 2.0 (three-dimensional photonic crystal E) or 3.0 (three-dimensional photonic crystal F). Vertical bars 15V denote the photonic band gap extent. Structural parameters are expressed using the lattice period "a", and are as follows: the lattice period is approximately a=680 nm; the width of the rod (e.g., 201dWY) is approximately 0.31a; the thickness of the rod (e.g., 201dTZ) is approximately 0.173553a; the thickness of the first discrete structure (e.g., 202bTZ) is approximately 0.10a; and the width of the first discrete structure in the y-direction (e.g., 202bWY) is approximately 0.66a. In this particular example of at least one exemplary embodiment the thickness of the first discrete structure (e.g., 202bTZ)=the thickness of the second discrete structure (e.g., 202aTZ), the width of the first discrete structure in the x-direction (e.g., 202bWX)=the width of the second discrete structure in the y-direction (e.g., 202aWY), and the width of the first discrete structure in the y-direction (e.g., 202bWY)=the width of the second discrete structure in the x-direction (e.g., 202aWX).

As illustrated in FIG. 15, the center wavelength of the photonic band gap can be controlled over a wider wavelength band by combining the parameters of the size and the refractive index of the discrete structures. In this example, the center wavelength of the photonic band gap can be controlled over an infrared wavelength band of 1330 nm to 1550 nm. Using a larger refractive index of the medium constituting the discrete structure and a larger cross-sectional area in the xy-plane can increase the effective refractive index of the three-dimensional photonic crystal, shifting the center wavelength of the photonic band gap to the longer wavelength side.

As in Example 1, three-dimensional photonic crystals G, H, and I (e.g., having structures G, H, and I) will be described as examples of the three-dimensional photonic crystal containing at least two regions of different discrete structures. Table 1 illustrates some of the parameters of the structures of the three-dimensional photonic crystals G, H, and I. They can satisfy the following relationships: the thickness of a first the discrete structure=the thickness of a second discrete structure, the width in the x-direction of the first discrete structure=the width in the y-direction of the second discrete structure, and the width in the y-direction of the first discrete structure=the width in the x-direction of the second discrete structure.

TABLE 1

| | Refractive index of rods | Refractive index of discrete structures | Lattice period | Width of rods | Thickness of rods | Thickness of discrete structures | Width of discrete structures |
|---|---|---|---|---|---|---|---|
| Structure G | 2.33 | 2.00 | a = 230 nm | 0.31 a | 0.173553 a | 0.10 a | 0.66 a |
| Structure H | 2.33 | 3.00 | a = 230 nm | 0.31 a | 0.173553 a | 0.10 a | 0.66 a |
| Structure I | 2.33 | 3.00 | a = 230 nm | 0.31 a | 0.173553 a | 0.10 a | 0.90 a |

Figure 16:
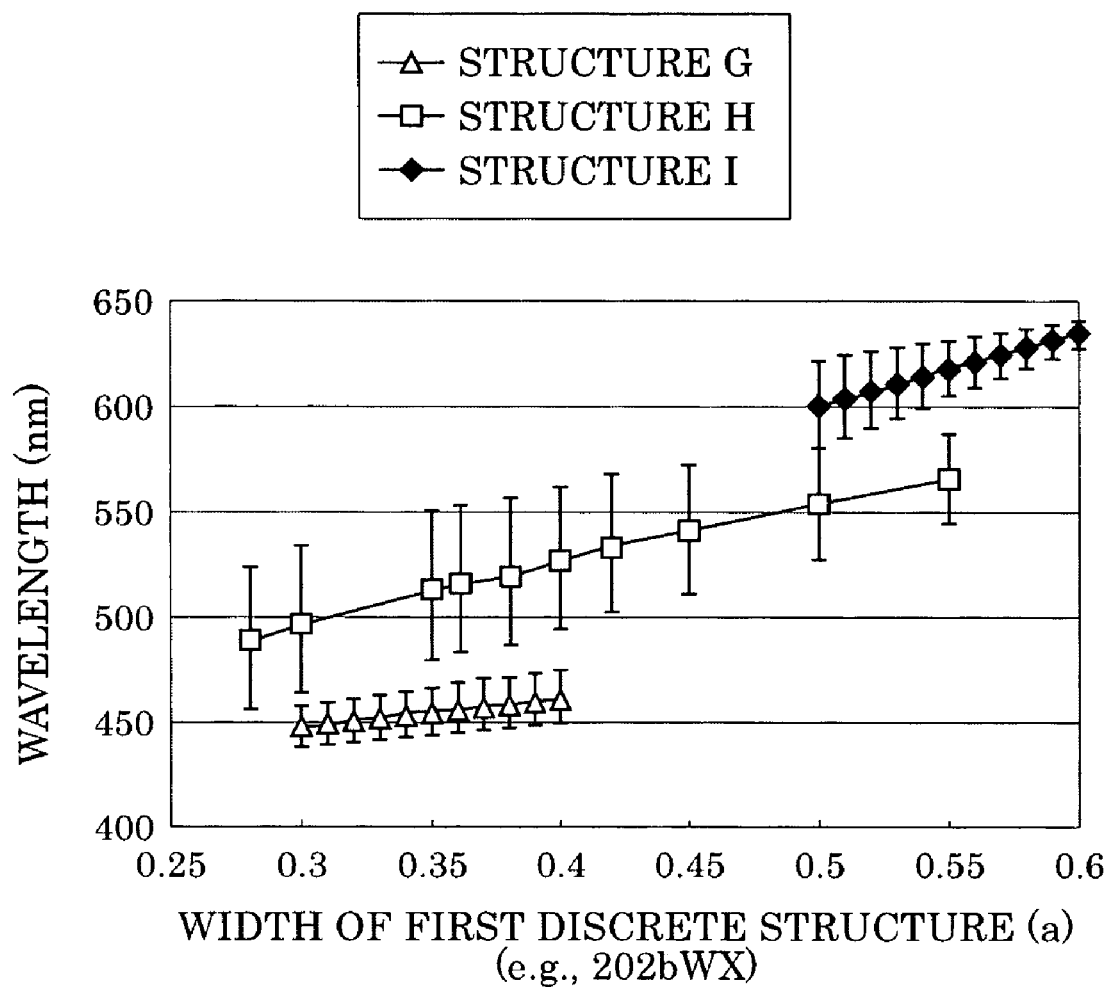
FIG. 16 illustrates a graph showing a relationship between the width 1x of the first discrete structure of three-dimensional photonic crystals G, H, and I and the center wavelength of the photonic band gap.

FIG. 16 illustrates the center wavelength of the photonic band gap and the photonic band gap extent in the three-dimensional photonic crystals G, H, and I. The vertical axis represents the center wavelength of the photonic band gap and the horizontal axis represents the width of the first discrete structure in the x-direction. Vertical bars denote the photonic band gap extent. The center wavelengths of the photonic band gap of the three-dimensional photonic crystals G, H, and I can be controlled in the vicinities of 450 nm, 530 nm, and 630 nm by adjusting the widths of the first discrete structures (e.g. in the x-direction) to 0.31a, 0.45a, and 0.58a, respectively.

Fabrication of discrete structures having a plurality of regions with different refractive indices can have the regions individually masked by a semiconductor process and the media, having different refractive indices for respective discrete structures, stacked.

While the number of discrete structure-containing layers is two in this particular example, there is no limit to the number of discrete layers an exemplary embodiment can have (e.g., three). In addition, the effect according to exemplary embodiments can be obtained even when the refractive index of the medium constituting the discrete structure or the shape or the size of the discrete structure is different from that described herein. Concurrent control of the shape and the refractive index of the discrete structure can change the effective refractive index of the three-dimensional photonic crystal. Thus, the center wavelength of the photonic band gap and the photonic band gap can be controlled over a wider wavelength band.

A resonator operating at a plurality of wavelengths in a wide wavelength band can use a material having a high refractive index and a reduced attenuation coefficient, and a photonic crystal structure having a wide photonic band gap. Exemplary embodiments can provide a three-dimensional photonic crystal in which the photonic band gap can be controlled over a wide wavelength band (e.g., including a wavelength band corresponding to the three primary colors of light, RGB) without changing the lattice period.

EXAMPLE 3

Figure 17A:
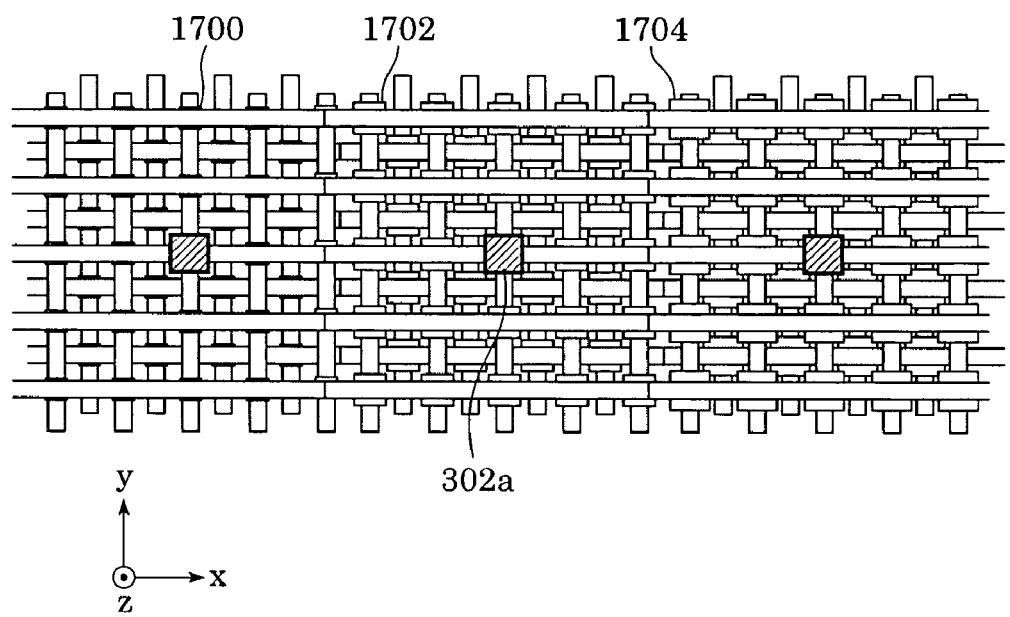
FIGS. 17A and 17B illustrate a top view and a side view, respectively, of a point defect resonator made of a three-dimensional photonic crystal that includes a plurality of regions containing discrete structures different in shape.
Figure 17B:
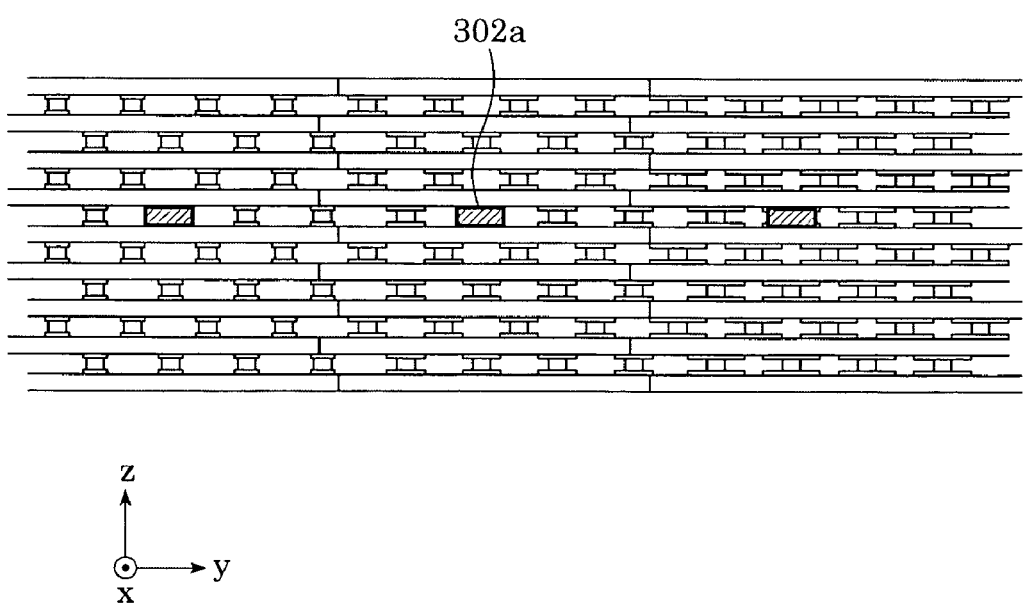

FIGS. 17A and 17B illustrate schematic views of a point defect resonator, which can be made of a three-dimensional photonic crystal that includes a plurality of regions containing discrete structures (e.g., 1700, 1702, 1704) different in shape. The center wavelength of the photonic band gap can be controlled by changing the shape of the discrete structures, while the lattice period in the xz-plane and the lattice period in the xy-plane are kept constant. The introduction of a point defect 302a into the three-dimensional photonic crystal can generate a resonant mode. Light having a wavelength corresponding to the resonant mode is localized in the point defect 302a. Examples of the point defect structure include a structure in which part of the periodic structure is deleted and air is placed in the point defect 302a, a structure in which part of the periodic structure is changed in shape (for example, the discrete structure in a certain lattice point is changed in shape), and a structure in which a material having a different refractive index is placed into part of the periodic structure. These structures can be provided by various methods as known by one of ordinary skill in the relevant art.

Figure 18:
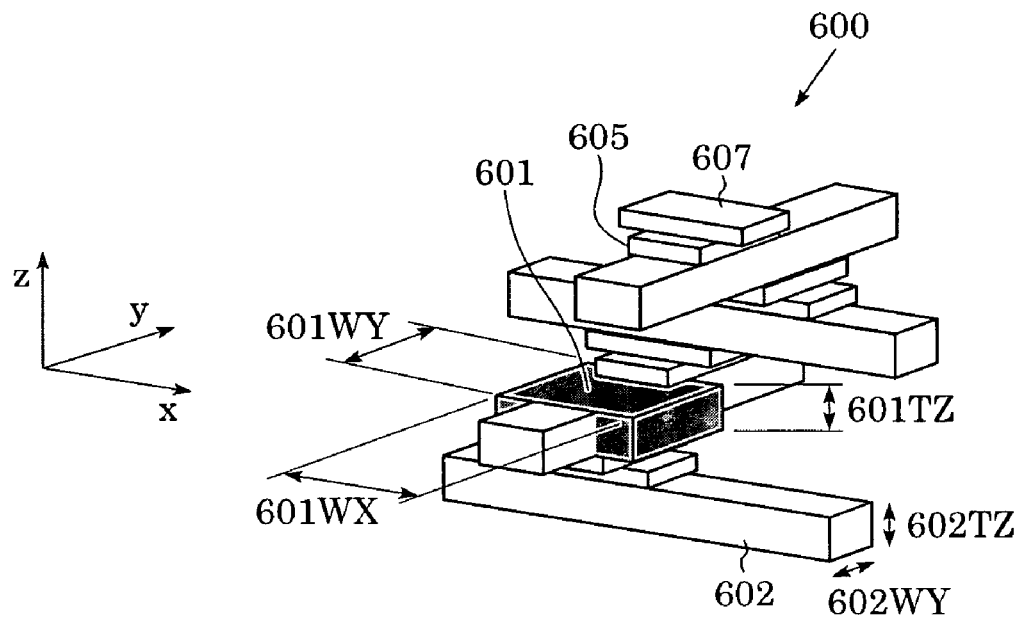
FIG. 18 illustrates a schematic view of a rectangular parallelepiped point defect in a three-dimensional photonic crystal.

FIG. 18 illustrates a three-dimensional photonic crystal 600 having two discrete structure-containing layers (e.g., 605 and 607). The three-dimensional photonic crystal 600, in this particular non-limiting example, has the following dimensions: the width of the rod 602WY is approximately 0.25a; the thickness of the rod 602TZ is approximately 0.30a; the width of the first discrete structure 605 in the x-direction is approximately 0.400a; the width of the first discrete structure 605 in eth y-direction is approximately 0.600a; the thickness of the first discrete structure 605 in the z-direction is approximately 0.050a; the width of the second discrete structure 607 in the x-direction is approximately 0.600a; the width of the second discrete structure 607 in the y-direction is approximately 0.400a; and the thickness of the second discrete structure 607 in the z-direction is approximately 0.050a. The refractive indices of the rods (e.g., 602) and the discrete structures (e.g., 605 and 607) can be various, but in this particular example are 3.309 where "a" denotes the lattice period. The point defect 302a, is a rectangular parallelepiped and has dimensions of $\Delta x = \Delta y = 0.70a$ and $\Delta z = 0.30a$. While the shape of the point defect 302a in the xy-plane is square ($\Delta x = \Delta y$), $\Delta x$ and $\Delta y$ may be different (e.g., circular, elliptic, triangular, or polygonal).

Figure 19:
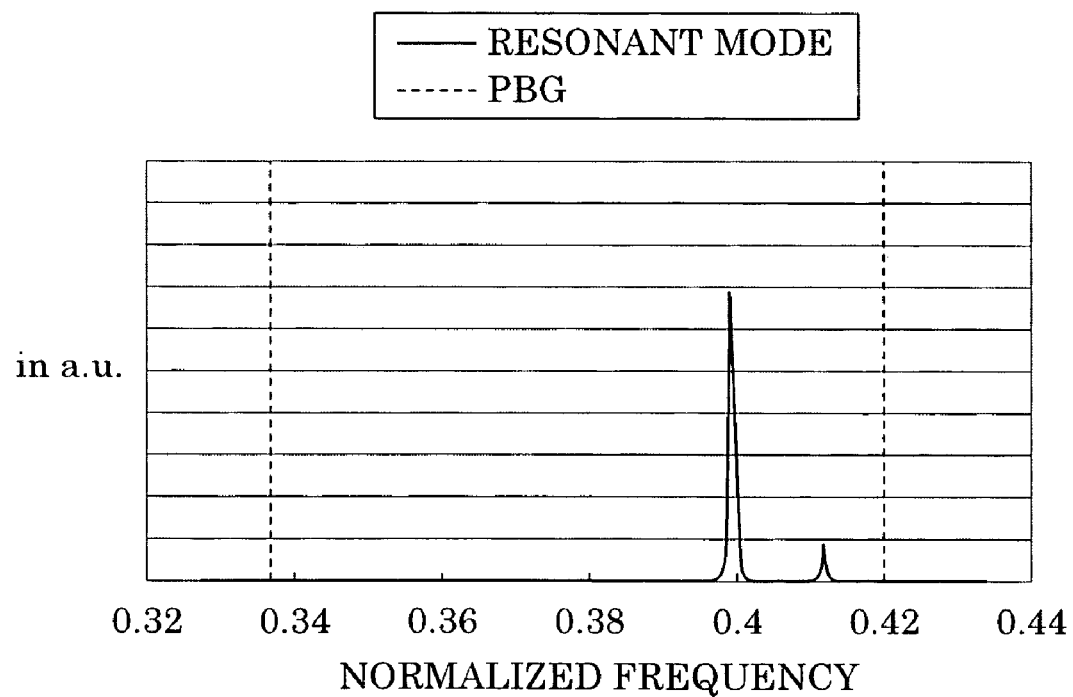
FIG. 19 illustrates a graph showing a resonant mode caused by a point defect.

FIG. 19 illustrates the resonant mode of the structure described in FIG. 18. The horizontal axis represents a frequency normalized by a lattice period "a." A large peak corresponding to the resonant mode appears at a normalized frequency of about 0.40. Variations in the size of the discrete structure change the resonant frequency (i.e., wavelength), change the filling factor of a material in the three-dimensional photonic crystal and shift the photonic band gap. Thus, the resonant wavelength can be controlled. A monolithic optical resonator operating at a plurality of wavelengths or a monolithic narrow-band-pass light filter can be constructed by placing a point defect in each of a plurality of regions containing different discrete structure-containing layers. One region may have a plurality of point defects 302a.

FIG. 20 illustrates a schematic view of a point defect resonator made of a three-dimensional photonic crystal J1 that has a point defect 302b and has a plurality of regions containing discrete structures (e.g., 2001, 2003, and 2005) different in refractive index. Since the three-dimensional photonic crystal J1 includes the regions having different effective refractive indices, the resonator can operate at different resonant wavelengths. The three-dimensional photonic crystal J1 can also be applied to a light filter for generating narrow-band spectra at a plurality of different wavelengths.

Figure 21A:
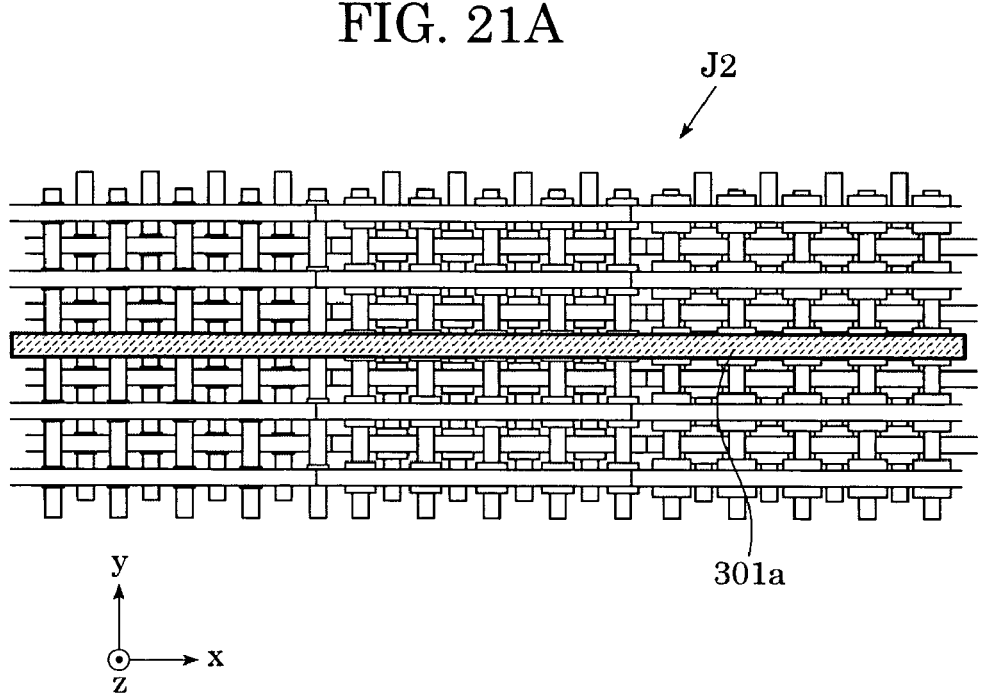
FIGS. 21A and 21B illustrate a top view and a side view, respectively, of a linear defect waveguide made of a three-dimensional photonic crystal having a plurality of regions containing discrete structures different in shape.
Figure 21B:
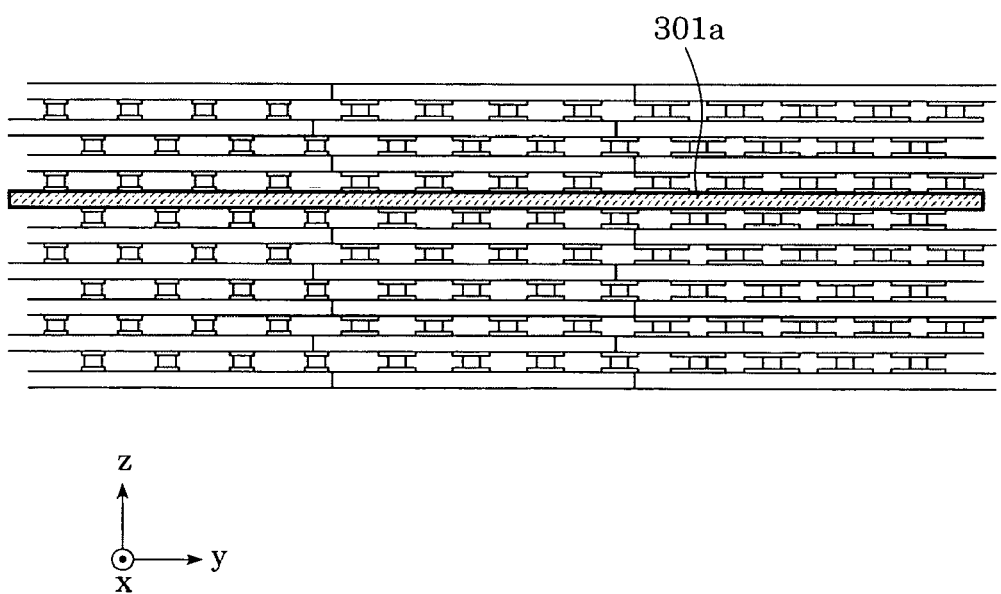

FIGS. 21A and 21B illustrate schematic views of a linear defect waveguide made of the three-dimensional photonic crystal J2 that includes a plurality of regions containing discrete structures different in shape. The introduction of a linear defect 301 into a fine periodic structure generates a guided mode due to the linear defect 301. Light having a wavelength corresponding to the guided mode is guided through the linear defect. The center wavelength of the photonic band gap is controlled by changing the shape of the discrete structure, while the lattice period in the xz-plane and the lattice period in the xy-plane are kept constant. Examples of the linear defect structure include a structure in which part of rods are removed, a structure in which the width of a rod is changed, a structure in which the refractive index of a rod material is changed, and a structure in which a rod is added. These structures can be provided by various methods as known by one of ordinary skill in the relevant art. A monolithic spectrally selective optical waveguide or a monolithic optical delay circuit can be constructed by connecting a plurality of structures in accordance with exemplary embodiments, with or without changing the lattice period.

Figure 22A:
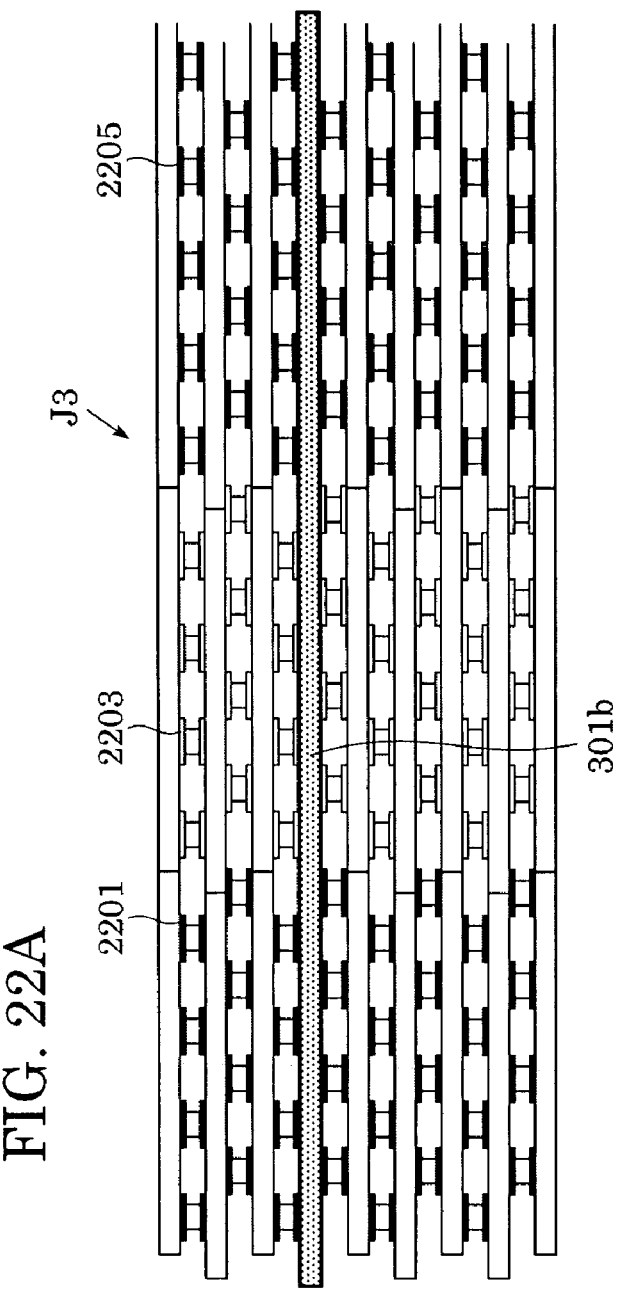
FIGS. 22A and 22B illustrate schematic views of a linear defect waveguide made of a three-dimensional photonic crystal having a plurality of regions containing discrete structures different in refractive index.
Figure 22B:
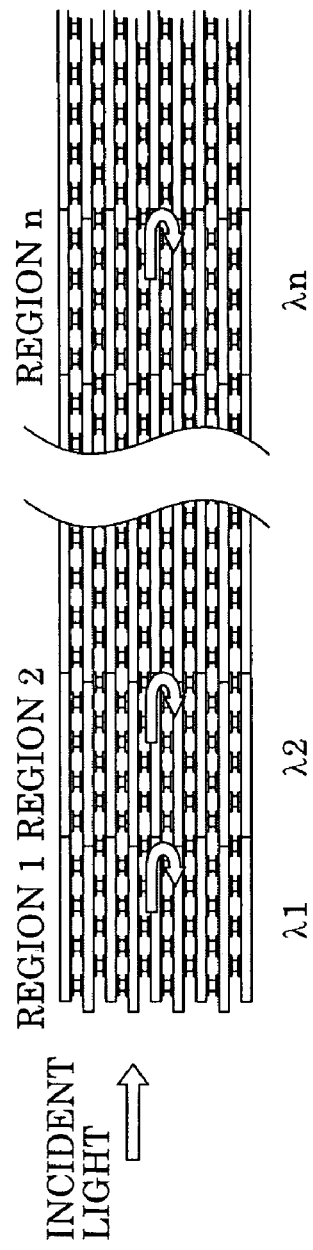

FIGS. 22A and 22B illustrate schematic views of a linear defect waveguide made of a three-dimensional photonic crystal J3 that has a linear defect 301b and has a plurality of regions containing discrete structures (e.g., 2201, 2203, and 2205) different in refractive index. A spectrally selective waveguide utilizing boundary reflection can be provided by controlling the refractive indices of the discrete structures in the plurality of regions to satisfy the relationship between the desired photonic band gap and the guided mode. Since the photonic band gap depends on the parameters of the discrete structure region, light $\lambda 1$ having a wavelength present in a region 1 but not in a region 2 is almost completely reflected by region 2 (FIG. 22B). The linear defect waveguide containing a plurality of such structures in a plane can be applied to a dispersion-compensation device for compensating for time delay at a plurality of wavelengths.

Figure 23:
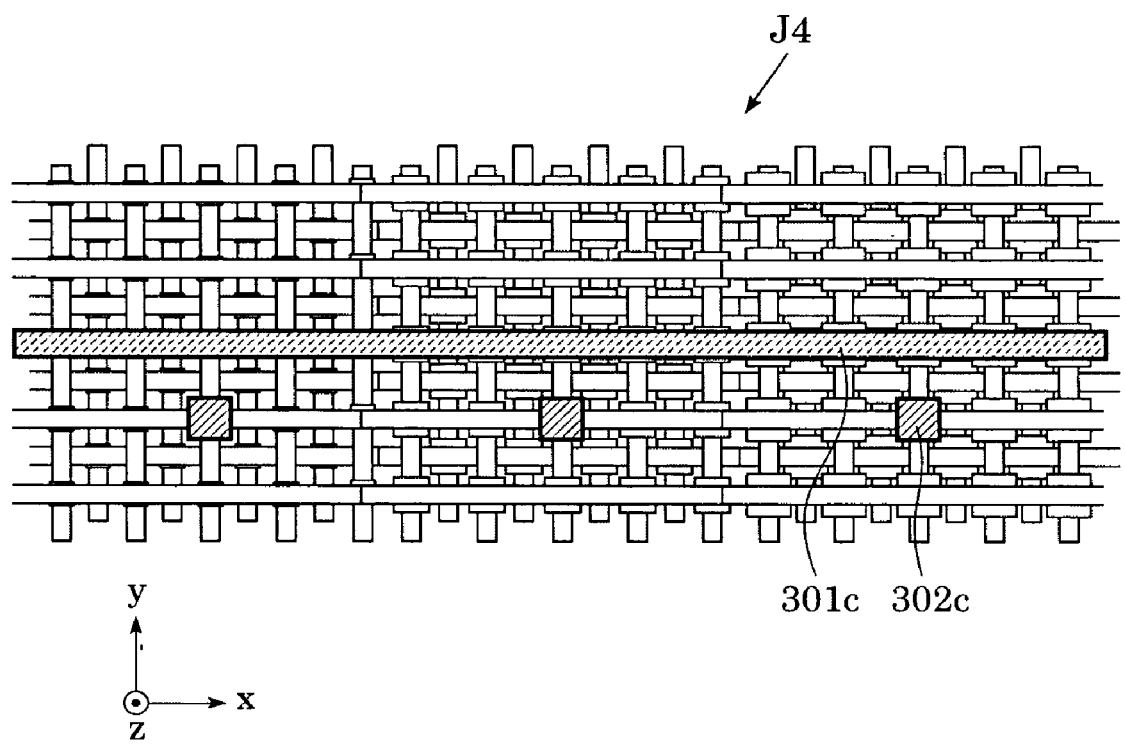
FIG. 23 illustrates a schematic view of an optical multiplexer/demultiplexer made of a three-dimensional photonic crystal having a plurality of regions containing discrete structures different in shape.
Figure 24A:
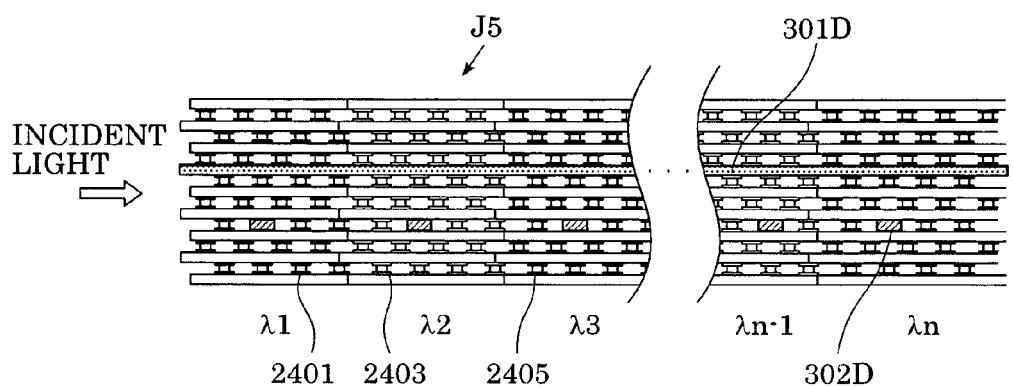
FIG. 24A illustrates a schematic view of an optical multiplexer/demultiplexer made of a three-dimensional photonic crystal having a plurality of regions containing discrete structures different in refractive index and FIG. 24B illustrates a graph showing the intensity of light entering a linear defect waveguide.
Figure 24B:
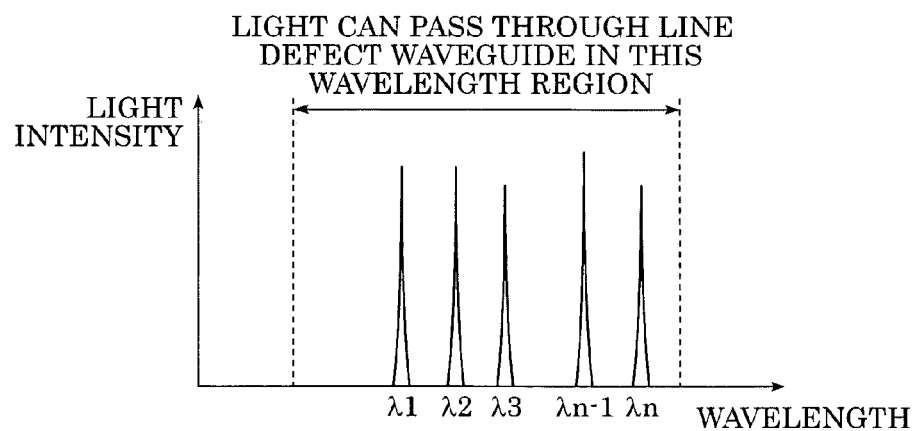

As illustrated in FIGS. 23 and 24A, a combination of a point defect (e.g., 302C and 302D) and a linear defect (e.g., 301C and 301D) can provide an optical multiplexing/demultiplexing circuit (add-drop optical circuit) that facilitates having an increased wavelength selectivity and an increased efficiency. FIG. 24A illustrates a schematic view of an optical multiplexer/demultiplexer made of a three-dimensional photonic crystal J5 that contains a linear defect 301D and a point defect 302D and has a plurality of regions containing discrete structures (e.g., 2401, 2403, and 2405) different in refractive index. The combined structure of an optical waveguide and a resonator facilitates the use of an optical multiplexer/demultiplexer, particularly in an optical communication band. A graph in FIG. 24B shows the intensity of light entering the linear defect waveguide, wherein the light resonates at wavelengths of $\lambda 1$, $\lambda 2$, $\lambda 3$, ..., and $\lambda n$ in a point defect resonator in each region. The resonant wavelengths of the point defects are included in a wavelength band at which light propagates through the linear defect waveguide. Thus, optical multiplex/demultiplex can be performed at the n wavelengths.

A three-dimensional photonic crystal according to exemplary embodiments can enhance a light trapping effect in the resonator, facilitating polarization control or radiation distribution control through improved resonator modal distribution control. In addition, since the resonator can be positioned in three dimensions, exemplary embodiments can have an increased degree of flexibility in the direction of beam extraction. This facilitates the operation in a narrow spectrum region, and can provide an increased-performance optical multiplexer/demultiplexer having a increased degree of flexibility in the direction of beam extraction.

Figure 25:
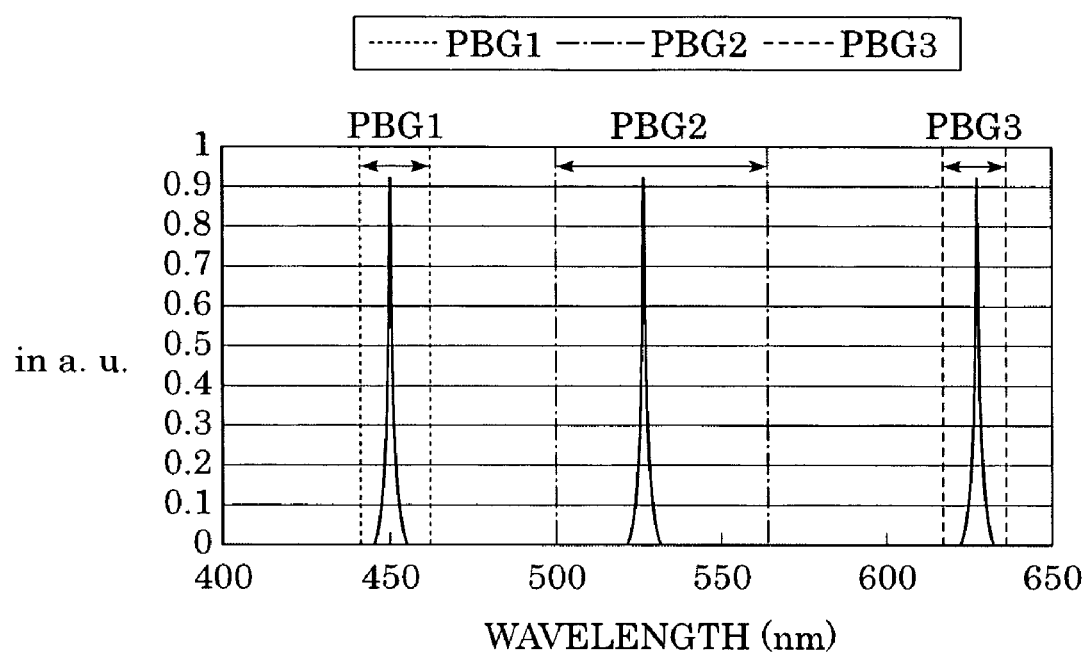
FIG. 25 illustrates a graph showing resonant mode spectra generated by a point defect resonator made of three-dimensional photonic crystals G, H, and I.

The size and the refractive index of the discrete structure can be combined as a variable to control the center wavelength of the photonic band gap. For example, appropriate point defects in the three-dimensional photonic crystals G, H, and I that have different discrete structures in three different regions can provide a resonator structure operating at respective different wavelengths. As illustrated in FIG. 25, a resonator structure having sharp spectral peaks around 450 nm, 530 nm, and 630 nm can be constructed by providing a point defect resonator structure that has resonant wavelengths within the photonic band gaps of the three-dimensional photonic crystals G, H, and I.

EXAMPLE 4

The present example of at least one exemplary embodiment relates to a light-emitting device in which a point defect containing a luminescent material is introduced into a three-dimensional photonic crystal that has a plurality of regions containing discrete structures different in shape and/or refractive index. As described above, the introduction of a point defect into the three-dimensional photonic crystal generates a resonant mode due to the point defect. Light having a wavelength corresponding to the resonant mode is localized in the point defect. Thus, the introduction of a luminescent material having a wavelength corresponding to the resonant mode as the point defect causes strong emission of light having a narrow spectral width at the resonant wavelength, thus providing increased efficiency light-emitting device that controls the behavior of light in three dimensions. Examples of the luminescent material include a compound semiconductor, an inorganic luminescent material, an organic luminescent material, a high molecular luminescent material, a quantum dot, a nanocrystal, other luminescent materials as known by one of ordinary skill in the relevant art, and equivalents. Examples of an excitation method include photoexcitation by an external light source, excitation by current injection, other methods of excitement as known by one of ordinary skill in the relevant art, and equivalents. In the excitation by current injection, for example, it is possible to sandwich a metallic material (e.g., Al or Cr), or a transparent conductive layer (e.g., ITO), as an electrode and make the metallic material emit light. Furthermore, an electrode that operates independently of a plurality of resonator structures can facilitate independent control of light having respective wavelengths.

Figure 26:
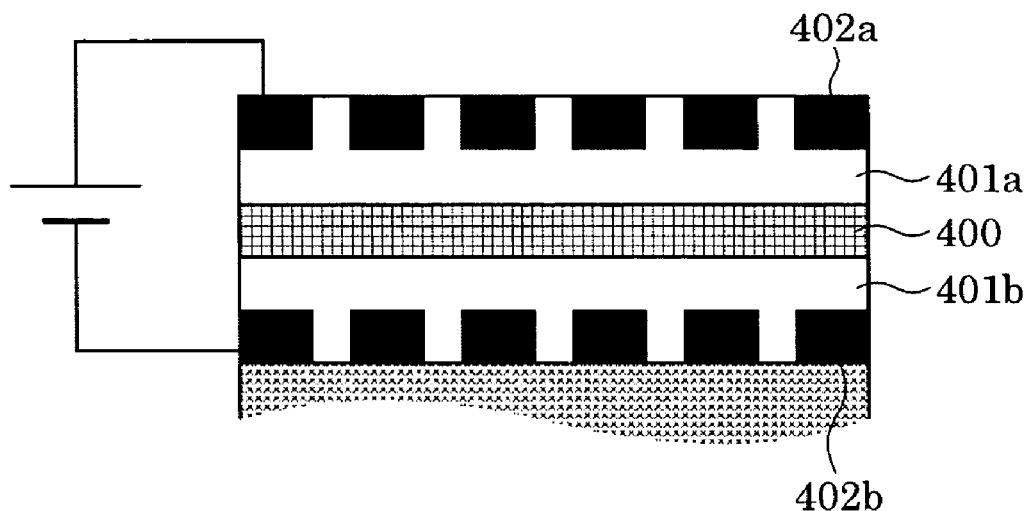
FIG. 26 illustrates a schematic view of a point defect light-emitting device, which can use an inorganic luminescent material according to an exemplary embodiment.

FIG. 26 illustrates an example, which can use an inorganic luminescent material. A luminescent layer 400, made of inorganic luminescent material, is sandwiched between insulators 401a and 401b, which have electrodes 402a and 402b on opposite sides of each other respectively. When such a luminous component is provided in a point defect resonator, light having a wavelength depending on the point defect resonator structure can be resonated and extracted. The electrodes can be made of a transparent material or may also be made of a metal (e.g., Al, Au, and Cr, or any other electrode material as known by one of ordinary skill in the relevant arts and equivalents). Examples of the inorganic luminescent material include ZnS:Mn, ZnMgS:Mn, ZnS:Sm, ZnS:Tb, ZnS:Tm, CaS:Eu, SrS:Ce, SrS:Cu, $SrGa_2S_4$:Ce, $BaAl_2S_4$:Eu, or any other inorganic luminescent material as known by one of ordinary skill in the relevant arts and equivalents. Examples of the insulator include $SiO_2$, SiN, $Al_2O_3$, $Ta_2O_5$, $SrTiO_3$, or any other insulator material as known by one of ordinary skill in the relevant arts and equivalents.

Figure 27:
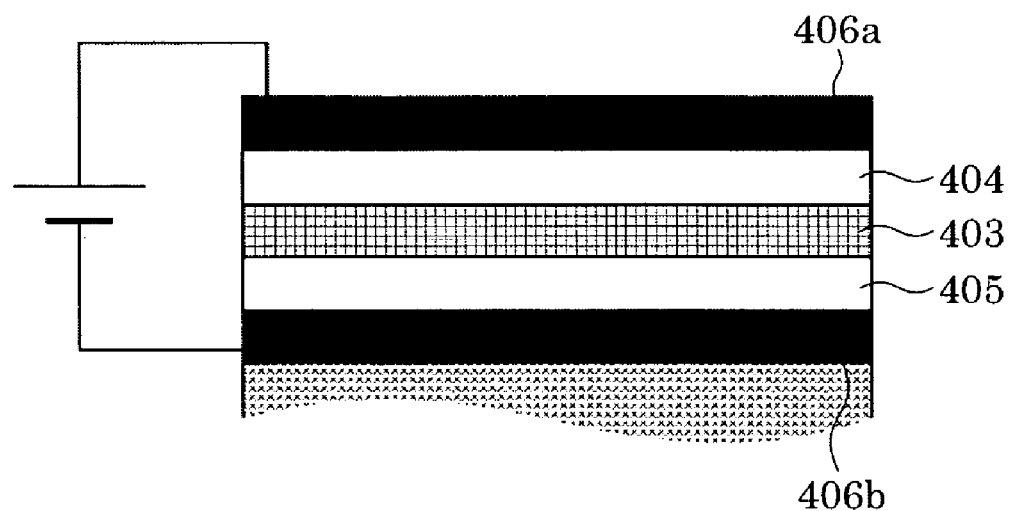
FIG. 27 illustrates a schematic view of a point defect light-emitting device, which can use an organic luminescent material according to an exemplary embodiment.

In exemplary embodiments the luminescent material can also be an organic luminescent material. FIG. 27 illustrates an exemplary embodiment, which can use a luminescent structure containing the organic luminescent material. A luminescent layer 403 containing the organic luminescent material is sandwiched between an electron transport layer 404 and a hole transport layer 405, both of which have electrodes 406a and 406b on opposite sides of each other respectively. The luminescent structure 403 emits light having a wavelength depending on the luminescent material. In addition, various structures containing, for example, an electron injection layer or a hole injection layer can be provided. The transparent electrode may be made of ITO, in this particular non-limiting example. A back electrode may be made of ITO or an opaque metal (e.g., Al or Cr), in this particular non-limiting example.

Typical examples of a low molecular organic luminescent material include Alq, $Eu(DBM)_3(Phen)$, BeBq, and DPVBi. Typical examples of a hole transport low molecular material include TPD, α-NPD, TPT, and Spiro-TPD. Typical examples of an electron transport low molecular material include PBD, TAZ, OXD, and Bphen. A typical high molecular organic luminescent material may be an electrically conductive polymer containing a polythiophene or polyaniline luminescent layer doped with an acid (e.g., polystyrene sulfonic acid or camphorsulfonic acid). The materials listed above and below are merely examples of materials that can be used in exemplary embodiments, other materials as known by one of ordinary skill in the relevant arts and equivalents can also be used in exemplary embodiments.

In addition to the examples shown in FIGS. 26 and 27, at least one exemplary embodiment can resonate and extract light having a particular wavelength. An example of this particular exemplary embodiment can include a luminescent structure (e.g., of the current injection type) provided in a point defect resonator structure, which can use a luminescent material (e.g., a material containing a compound semiconductor, an inorganic luminescent material, an organic luminescent material, a high molecular luminescent material, a quantum dot or a nanocrystal).

Figure 28A:
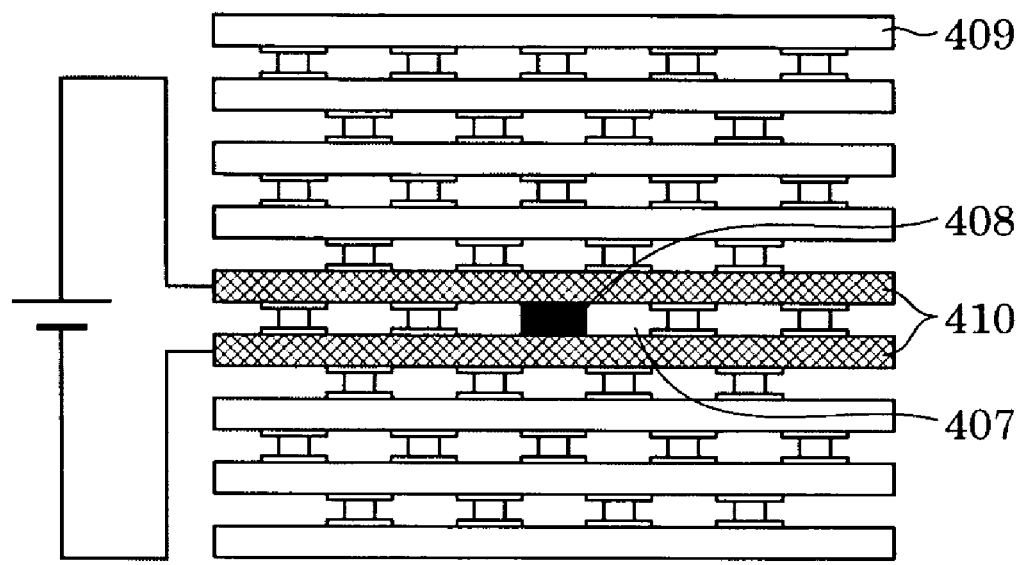
FIGS. 28A and 28B illustrate schematic views of point defect light-emitting devices, which can use transparent electrodes for current injection according to an exemplary embodiment.
Figure 28B:
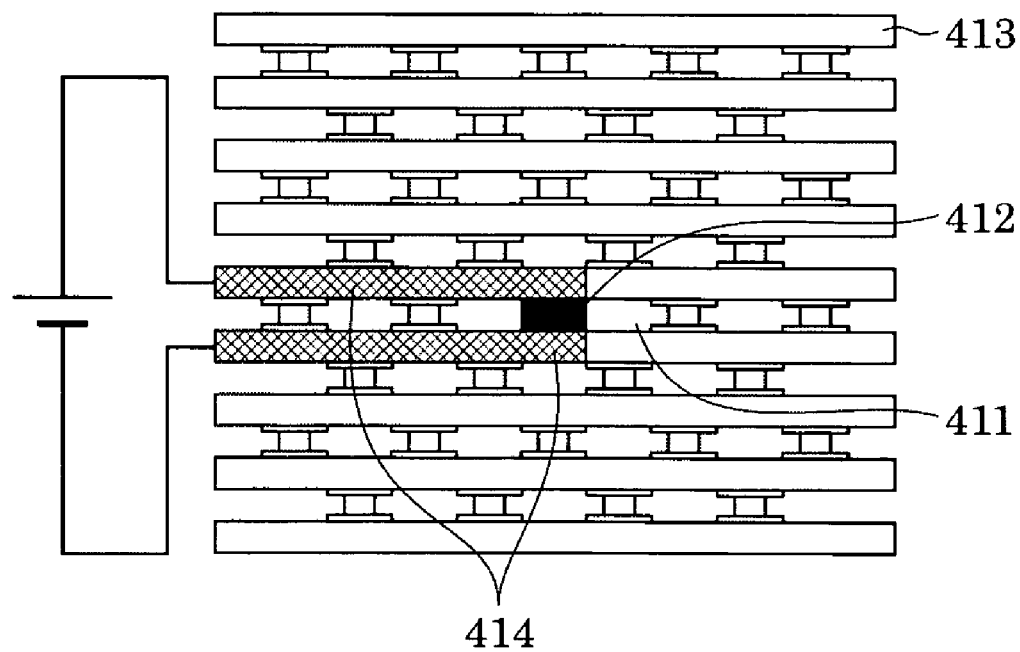

FIGS. 28A and 28B illustrate examples using a transparent conductive electrode (e.g., ITO), as the current injection electrode. Use of the transparent electrode as a waveguide and an electrode can simplify light extraction from a point defect resonator in a photonic crystal. For example, when a luminescent material 408 in a point defect resonator 407 is current-injected from transparent electrodes 410 passing through photonic crystals 409 light can be emitted. The transparent electrodes 410 themselves can be linear defects for the periodic photonic crystals 409, and the transparent electrodes 410 can act as waveguides and guide part of the emitted light resonated by the point defect resonator 407 to the outside of the photonic crystals.

Figure 29:
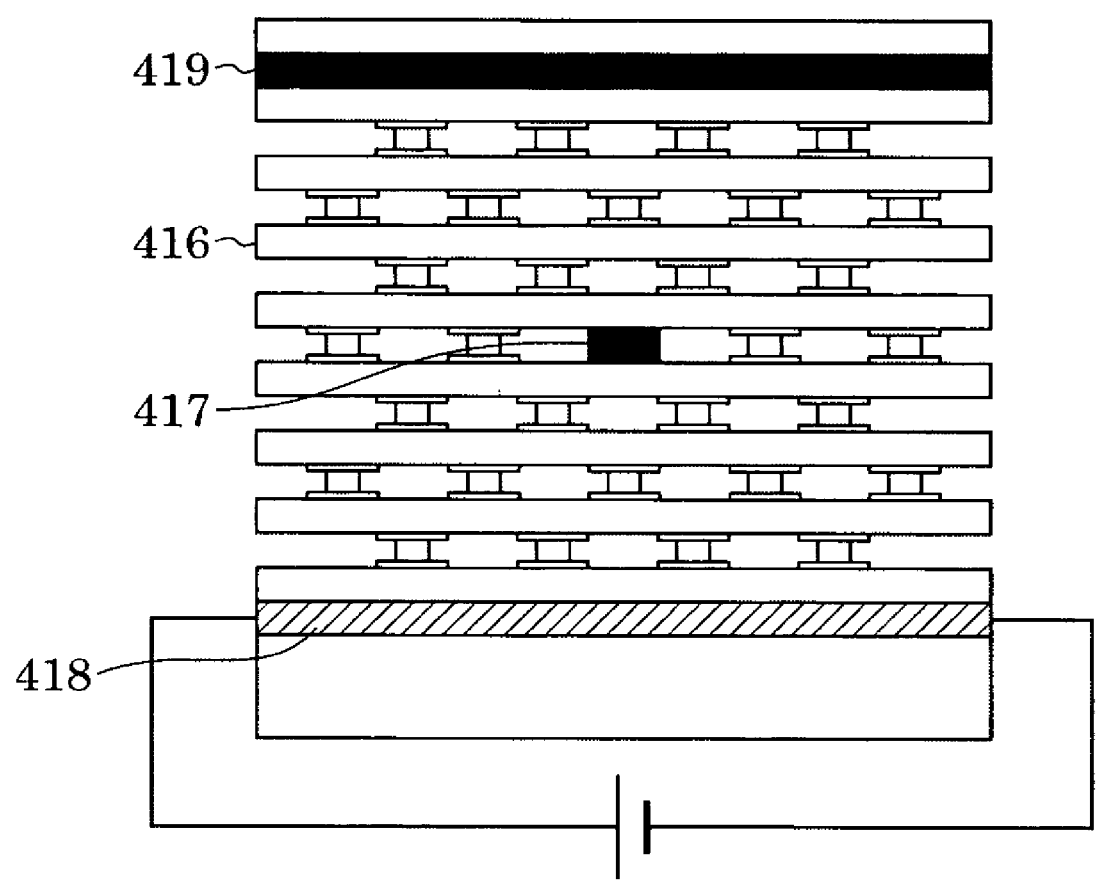
FIG. 29 illustrates a schematic view of a point defect light-emitting device, which can use an external light source according to an exemplary embodiment.

In photoexcitation, using an external light source, the use of excitation light having a wavelength outside the photonic band gap facilitates the excitation of the luminescent material, improving the efficiency and emission of light. FIG. 29 illustrates a schematic view of a luminescent structure 415 as an example of an exemplary embodiment in which a luminescent layer is photoexcited using an external light source. Photonic crystals 416 having a desired photonic band gap can include a point defect resonator 417, which can contain a fluorescent substance emitting fluorescence within the photonic band gap. A light source 418 (e.g., UV), which emits light at a wavelength equal to or less than the photonic band gap, is provided at the bottom of the photonic crystals 416 to facilitate the excitation and emission of the fluorescent substance in the resonator structure. In addition, a wavelength selection filter 419 for passing the light from the resonator structure and blocking the excitation light from the light source 418 can be provided in the upper part of the photonic crystals. The wavelength selection filter 419 can block the light (e.g., ultraviolet) from the light source 418 to an observer and thus improve visibility. Furthermore, light from the luminescent layer can be controlled by changing a voltage applied to the light source.

When light sources that contain luminous media, having emission spectra containing resonant wavelengths, are provided in the resonator structures in a three-dimensional photonic crystal, that has a plurality of regions containing discrete structures different in shape and/or refractive index, a monolithic laser that emits light at respective resonant wavelengths can be provided. For example, a monolithic multiwavelength laser source can be provided in accordance with exemplary embodiments by matching the resonant wavelength with the wavelength of the optical communication band (the O band (1260 nm to 1360 nm), the E band (1369 nm to 1460 nm), the S band (1460 nm to 1530 nm), the C band (1530 nm to 1565 nm), the L band (1565 nm to 1625 nm), and the U band (1625 nm to 1675 nm)). This achieves the miniaturization and the integration of a light source for the optical communication. Furthermore, an RGB monolithic laser source can be provided, in accordance with exemplary embodiments, by matching the resonant wavelengths with those of the three primary colors of light: red (R), green (G), and blue (B). Such an RGB monolithic laser source is useful particularly for a full-color light source of a visual display unit, (e.g., a projection display). Typical RGB wavelength bands are λR=600 nm to 780 nm for the R wavelength band; λG=500 nm to 600 nm for the G wavelength band; and λB=380 nm to 500 nm for the B wavelength band. Specific methods for emitting light include the various methods described above and any other method for emitting light as known by one of ordinary skill in the relevant art and equivalents.

In exemplary embodiments, the resonant wavelength is not limited to the RGB three colors. For example, a light source for optical read/write in a compact disc (CD) or DVD is designed to have a resonant wavelength of about 785 nm or about 660 nm. The monolithic laser can also be applied to a light source for high-density optical read/write using a blue wavelength band of 405 nm. A monolithic light source that emits light having three wavelengths can also be provided as the light source for the optical read/write. This monolithic light source is useful in miniaturizing and integrating an optical read/write head of the optical disk.

EXAMPLE 5

Figure 30:
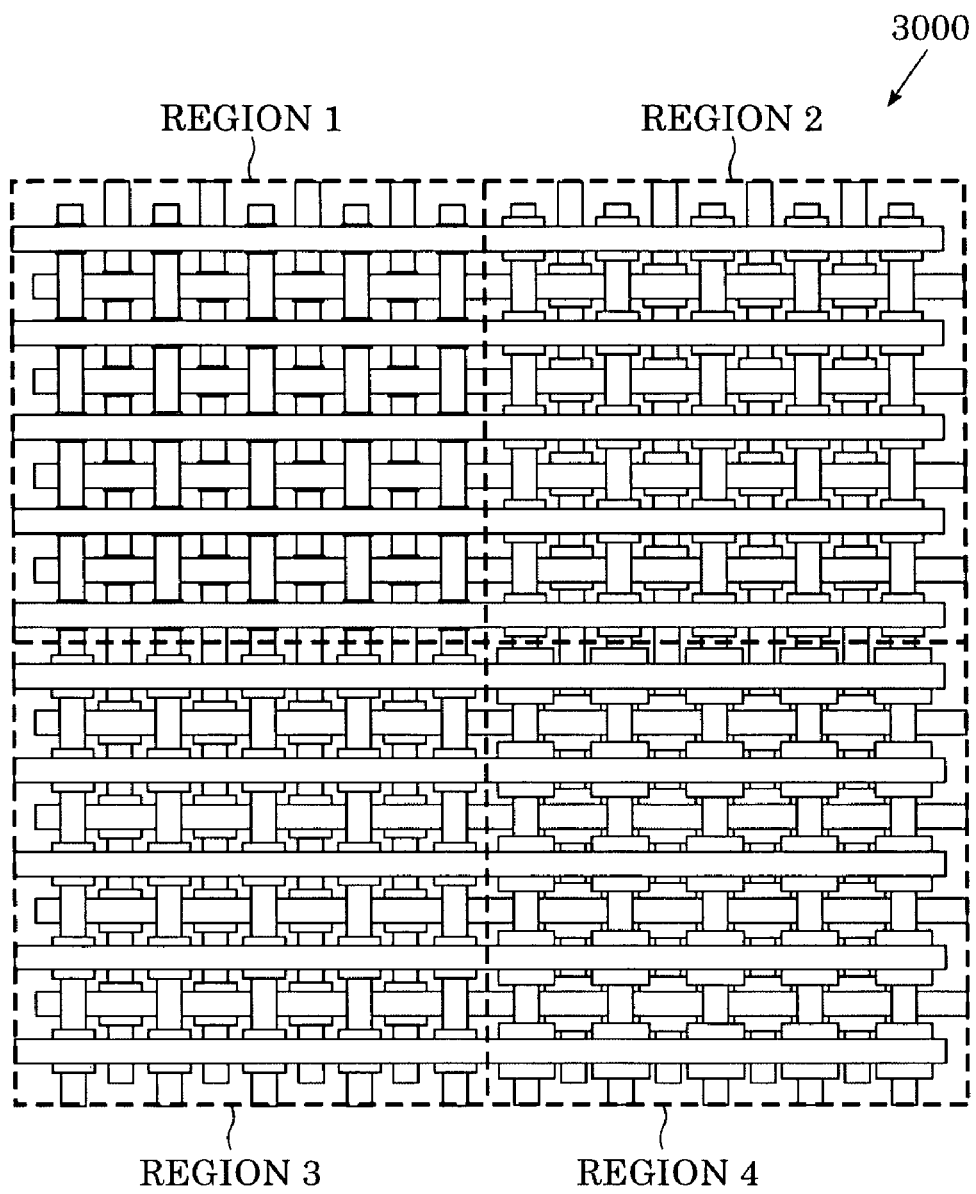
FIG. 30 illustrates a schematic view of a color filter element according to an exemplary embodiment.
Figure 31:
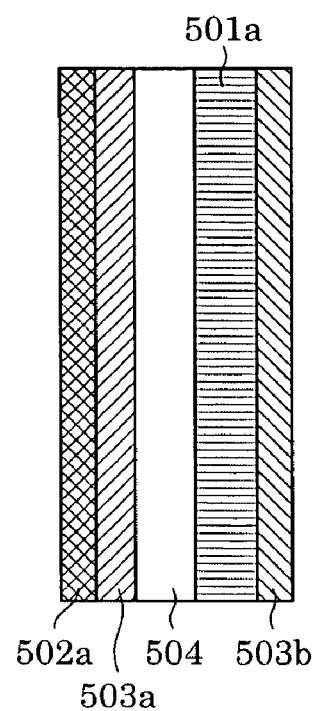
FIG. 31 illustrates a schematic view of one application of the color filter element according to an exemplary embodiment.
Figure 32:
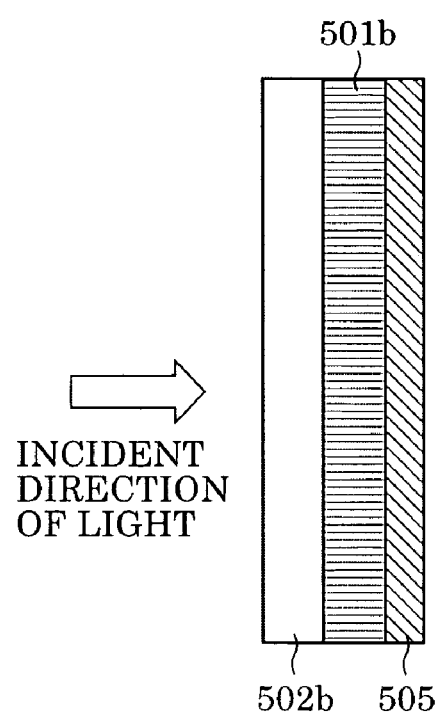
FIG. 32 illustrates a schematic view of another application of the color filter element according to an exemplary embodiment.
Figure 33A:
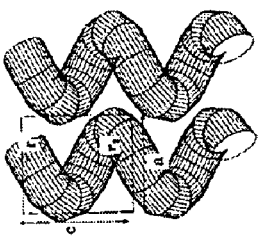
FIGS. 33A to 33F illustrate schematic views of conventional three-dimensional photonic crystals.
Figure 33B:
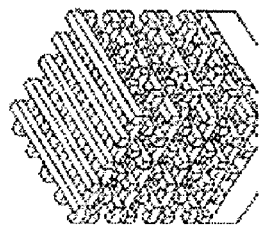
Figure 33C:
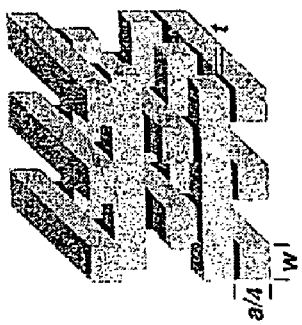
Figure 33D:
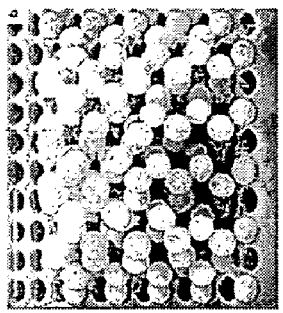
Figure 33E:
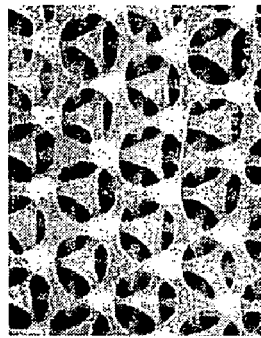
Figure 33F:
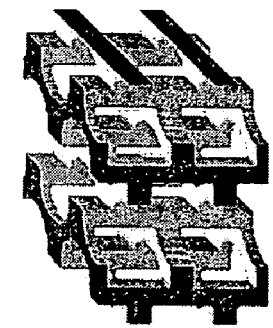

FIG. 30 illustrates a schematic view of a color filter 3000 using a three-dimensional photonic crystal according to an exemplary embodiment in various regions (e.g., Regions 1–4). Color filter 3000 can have a structure containing a plurality of three-dimensional photonic crystals each having a design wavelength band in the photonic band gap. Thus, for example, when each of the three-dimensional photonic crystal is designed to coincide with the pixel area of a liquid crystal panel, the color filter can be used as a display color filter. As illustrated in FIG. 31, a color filter (e.g., 501*a*) according to at least one exemplary embodiment can be placed on the back of a reflective liquid crystal panel (e.g., 504) to provide a display panel. Furthermore, a color filter (e.g., 501*b*) according to at least one exemplary embodiment can be equipped with an image sensor 505, (e.g., CCD or CMOS), to provide a complementary filter (FIG. 32). The three-dimensional periodic structure design facilitates selection of the operating center wavelength and the operating wavelength band. In addition, the use of the photonic band gap can lead to improved quality color filter having narrow emission band, low incident angle dependence and improved color reproducibility. In addition, structures corresponding to respective operating wavelengths can be manufactured by one operation. Additionally, alignment of exemplary embodiments of photonic crystals with a liquid crystal display panel or an image sensor can be facilitated.

At least one exemplary embodiment can have a refractive index period smaller than a design wavelength. Further exemplary embodiments can be used as optical elements, such as a light-emitting device or an optical circuit, that has a defect in a three-dimensional photonic crystal and that is provided with a point defect resonator or a linear defect waveguide operating at a desired wavelength.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2004-228234 filed Aug. 4, 2004, which is hereby incorporated by reference herein in its entirety.

What is claimed is:

1. A three-dimensional photonic crystal comprising:
a first layer including a plurality of columnar structures spaced apart by a predetermined interval;
a second layer including a plurality of columnar structures spaced apart by a predetermined interval, the columnar structures extending in a direction different from that of the columnar structures in the first layer;
a third layer including a plurality of columnar structures spaced apart by a predetermined interval, the columnar structures extending in substantially the same direction as that of the columnar structures in the first layer;
a fourth layer including a plurality of columnar structures spaced apart by a predetermined interval, the columnar structures extending in substantially the same direction as that of the columnar structures in the second layer; and
additional layers, each including at least one layer containing discrete structures disposed discretely in a plane substantially parallel to each of the first through fourth layers,
wherein the first to fourth layers are stacked sequentially with the additional layer adjacent to at least two of the first, the second, the third, and the fourth layer,
wherein the first layer and the third layer are stacked such that the columnar structures in the first layer and the third layer are mutually shifted by about one-half the first predetermined interval in a direction substantially perpendicular to the direction of the extension of the columnar structures of the first layer,
wherein the second layer and the fourth layer are stacked such that the columnar structures in the second layer and the fourth layer are mutually shifted by about one-half the second predetermined interval in a direction substantially perpendicular to the direction of the extension of the columnar structures of the second layer,
wherein discrete structures contained in the additional layers are disposed at positions corresponding to the intersections of adjacent columnar structures of stacked layers, and the three-dimensional photonic crystal contains at least two regions of different discrete structures.

2. The three-dimensional photonic crystal according to claim 1, wherein the at least two regions containing discrete structures are different in at least one of shape and refractive index.

3. The three-dimensional photonic crystal according to claim 1, wherein the at least two regions containing different discrete structures have different photonic band gaps.

4. The three-dimensional photonic crystal according to claim 1, wherein a region outside the columnar structures and outside the discrete structures is filled with a medium different from the medium constituting the columnar structures and the discrete structures.

5. The three-dimensional photonic crystal according to claim 4, wherein the columnar structures and the discrete structures have higher refractive indices than the medium filled in the region outside the columnar structures and outside the discrete structures.

6. The three-dimensional photonic crystal according to claim 5, wherein the higher relative refractive indices are higher than twice of the refractive index of the medium filled in the region outside the columnar structures and outside the discrete structures.

7. The three-dimensional photonic crystal according to claim 1, wherein the columnar structures of the first layer and the columnar structures of the second layer intersect at substantially a right angle.

8. An optical element containing at least one defect in the three-dimensional photonic crystal according to claim 1.

9. The optical element according to claim 8, wherein the at least one defect is at least one linear defect, wherein the at least one linear defect functions as a waveguide.

10. The optical element according to claim 9, wherein the optical element operates as a dispersion-compensation device at a plurality of wavelengths.

11. The optical element according to claim 8, wherein the at least one defect is at least one point defect, wherein the at least one point defect functions as a resonator.

12. The optical element according to claim 11, wherein the optical element operates as a narrow spectrum light filter at a plurality of wavelengths.

13.

14. The optical element according to claim 11, wherein each of the regions containing different discrete structures in the three-dimensional photonic crystal has at least one point defect, wherein a first region has a first point defect and a second region has a second point defect, wherein the first and second point defects include a luminescent material, and wherein the optical element emits light at a plurality of wavelengths.

15. The optical element according to claim 14, wherein the optical element is a laser element that emits light at a plurality of wavelengths in an infrared optical communication wavelength band.

16. The optical element according to claim 14, wherein the optical element is a laser element that emits light at a plurality of wavelengths in a visible wavelength band.

17. The optical element according to claim 16, wherein the optical element emits light at a wavelength of red light, a wavelength of green light and a wavelength of blue light.

18. The optical element according to claim 14, wherein the optical element is a laser element that emits light at a plurality of wavelengths in a read/write wavelength band of an optical disk.

19. An optical element comprising:
the three-dimensional photonic crystal according to claim 1, wherein the optical element operates as a color filter at a plurality of wavelengths.

20. The photonic crystal according to claim 1, wherein the medium outside the columnar structures and outside the discrete structures is at least one of a vacuum, air, a solid material, and a liquid.

* * * * *